US012752871B2

(12) United States Patent
Wamßer et al.

(10) Patent No.: US 12,752,871 B2
(45) Date of Patent: Oct. 6, 2026

(54) MANIPULATION UNIT, INSTALLATION HAVING MANIPULATION UNITS, AND METHOD FOR OPERATING AN INSTALLATION HAVING MANIPULATION UNITS

(71) Applicants: Dürr Systems AG, Bietigheim-Bissingen (DE); DURR Assembly Products GmbH, Püttlingen (DE); CPM S.p.A., Turin (IT)

(72) Inventors: Clemens Wamßer, Bietigheim-Bissingen (DE); Viktor Beck, Heubach (DE); Michael Baitinger, Freiberg am Neckar (DE); Dieter Beck, Reinheim (DE); Jörg Neumann, Reinsfeld (DE); Brian William Berry, Saarbrücken (DE); Ismail Kurt, Völklingen (DE); Timo Wallscheid, Schmelz (DE); Joachim Kaufmann, Saarlouis (DE); Massimo Bellezza, Turin (IT); Denny Monti, Castiglione Torinese (IT)

( * ) Notice: Subject to any disclaimer, the term of this patent is extended or adjusted under 35 U.S.C. 154(b) by 0 days.

(21) Appl. No.: 18/870,317

(22) PCT Filed: Jun. 5, 2023

(86) PCT No.: PCT/DE2023/100425
§ 371 (c)(1),
(2) Date: Nov. 27, 2024

(87) PCT Pub. No.: WO2023/237158
PCT Pub. Date: Dec. 14, 2023

(65) Prior Publication Data

US 2025/0326453 A1 Oct. 23, 2025

(30) Foreign Application Priority Data

Jun. 7, 2022 (IT) ........................ 102022000012020
Oct. 24, 2022 (DE) ..................... 10 2022 128 024.1

(51) Int. Cl.
*B62D 65/18* (2006.01)
*B62D 65/06* (2006.01)

(52) U.S. Cl.
CPC ............. *B62D 65/18* (2013.01); *B62D 65/06* (2013.01)

(58) Field of Classification Search
CPC ... B62D 65/18; B62D 65/06; Y10T 29/49829; Y10T 29/49831
(Continued)

(56) References Cited

U.S. PATENT DOCUMENTS 4,464,998 A * 8/1984 Wakabayashi ........ B61B 10/022 198/803.11
4,475,462 A * 10/1984 Tsumaki ................ B62D 65/00 198/798
(Continued)

FOREIGN PATENT DOCUMENTS

CN 111532538 A 8/2020
DE 102004057664 A1 6/2006
(Continued)

OTHER PUBLICATIONS

International Searching Authority, "International Search Report," issued in connection with International Application No. PCT/DE2023/100425, Aug. 16, 2023, 4 pages.
(Continued)

*Primary Examiner* — Sarang Afzali
*Assistant Examiner* — Darrell C Ford
(74) *Attorney, Agent, or Firm* — Hanley, Flight & Zimmerman, LLC

(57) ABSTRACT

(EN) The invention relates to a manipulation unit (100) for horizontally and/or vertically moving a workpiece (700), the
(Continued)

manipulation unit being in particular in the form of a driverless transport vehicle which is movable for its intended purpose over a floor (500), having wheels (110), a support frame (120), and a workpiece receptacle (130) fastened to the support frame (120), wherein the support frame (120) is open on several sides and has a side opening (122) for entry and/or exit of a separate manipulation unit (200, 300) and a floor opening (124) in the direction of the floor (500). The invention also relates to an installation having a manipulation unit (100) of this type and to a method for operating such an installation.

38 Claims, 22 Drawing Sheets

(58) Field of Classification Search
USPC .............................................................. 29/430
See application file for complete search history.

(56) References Cited

U.S. PATENT DOCUMENTS

| | | | | |
|---|---|---|---|---|
| 4,878,054 | A | 10/1989 | Reynaud | |
| 4,909,155 | A * | 3/1990 | Katayama | B62D 65/18 105/148 |
| 5,037,045 | A * | 8/1991 | Wakabayashi | B62D 65/18 33/712 |
| 5,251,739 | A | 10/1993 | Tolocko | |
| 5,351,384 | A * | 10/1994 | Barnhart | B62D 65/14 29/430 |
| 5,686,148 | A | 11/1997 | Suzuki | |
| 6,481,096 | B2 * | 11/2002 | Lehmker | B23P 19/04 29/721 |
| 7,497,167 | B2 | 3/2009 | Bellezza | |
| 7,770,780 | B2 | 8/2010 | Monti et al. | |
| 8,474,683 | B2 | 7/2013 | Kilibarda | |
| 9,090,357 | B2 * | 7/2015 | Oberoi | B64F 5/50 |
| 9,150,264 | B2 | 10/2015 | Monti et al. | |
| 9,533,725 | B2 | 1/2017 | Bellezza | |
| 9,764,434 | B2 * | 9/2017 | Jensen | H02K 15/16 |
| 10,131,388 | B2 | 11/2018 | Kilibarda | |
| 10,640,297 | B2 | 5/2020 | Kilibarda et al. | |
| 11,167,305 | B2 | 11/2021 | Schwab et al. | |
| 11,267,585 | B2 * | 3/2022 | Datas | B23K 37/0426 |
| 12,042,925 | B2 | 7/2024 | Zhao et al. | |
| 2001/0042672 | A1 * | 11/2001 | Di Rosa | B25B 5/087 198/345.3 |
| 2004/0149542 | A1 | 8/2004 | Kyotani | |
| 2004/0206605 | A1 * | 10/2004 | Shibata | B62D 65/18 198/465.4 |
| 2005/0025612 | A1 | 2/2005 | Ehrenleitner | |
| 2009/0010746 | A1 * | 1/2009 | Okazaki | B62D 65/18 414/590 |
| 2011/0099788 | A1 * | 5/2011 | Kilibarda | B66F 7/14 29/244 |
| 2011/0225798 | A1 * | 9/2011 | Shimoda | B62D 65/10 29/430 |
| 2012/0304446 | A1 | 12/2012 | Kilibarda | |
| 2013/0014370 | A1 | 1/2013 | Kenji | |
| 2020/0071084 | A1 | 3/2020 | Mauletti et al. | |

FOREIGN PATENT DOCUMENTS

| | | | |
|---|---|---|---|
| DE | 102005062691 | A1 | 7/2007 |
| DE | 102022128024 | A1 | 12/2023 |
| EP | 218663 | A1 | 4/1984 |
| EP | 1426275 | A1 | 6/2004 |
| EP | 2218633 | A1 | 8/2010 |
| KR | 101533769 | B1 | 7/2015 |
| WO | 2011053681 | A1 | 5/2011 |

OTHER PUBLICATIONS

International Searching Authority, "Written Opinion," issued in connection with International Application No. PCT/DE2022/100425, Aug. 16, 2023, 10 pages.
German Patent and Trademark Office, "Search Report," issued in connection with German Patent Application No. 10 2022 128 024.1 on Oct. 24, 2022, 26 pages.
United States Patent and Trademark Office, "Non-Final Office Action," issued in connection with U.S. Appl. No. 18/871,984, dated Jul. 14, 2026, 12 pages.

* cited by examiner

MANIPULATION UNIT, INSTALLATION HAVING MANIPULATION UNITS, AND METHOD FOR OPERATING AN INSTALLATION HAVING MANIPULATION UNITS

RELATED APPLICATIONS

This application is a national phase of International Application No. PCT/DE2023/100425, filed on Jun. 5, 2023, which claims the benefit of Italian Application No. 102022000012020, filed on Jun. 7, 2022, and German Application No. 10 2022 128 024.1, filed on Oct. 24, 2022. The foregoing International Application, Italian Application and German Application are incorporated herein by reference in their entireties and for all purposes.

FIELD OF THE DISCLOSURE

The disclosure relates to a manipulation unit, an installation having manipulation units and a method for operating an installation having manipulation units, in particular for manufacturing vehicles.

BACKGROUND

It is known that during the production of vehicles the painted bodies have to be processed from different levels. Generally a body is moved from one process station to the other on a ceiling suspension system of the production hall. The absorption of the weight force of the body and ceiling suspension system acting thereon has to be considered in the static design of the production hall and significantly increases the costs therefor. If processing is required on the underside of the body, suitable pits are provided in the hall floor at suitable stations which permit access to the underside of the body. An increase or reduction in the production, or changing the model of the vehicle to be produced, generally require cost-intensive and time-consuming structural works on the pits, the ceiling suspension and/or the production hall.

SUMMARY

The object of examples disclosed herein is to provide a manipulation unit which permits a flexible adaptation to changed requirements when processing workpieces.

A further object is providing an installation with a group of manipulation units, which permits a flexible adaptation to changed requirements when processing workpieces.

A further object is providing an installation with a plurality of manipulation units, which permits a flexible adaptation to changed requirements when processing workpieces.

A further object is providing a manipulation unit for receiving parts of a workpiece, which permits a flexible adaptation to changed requirements when processing the workpiece.

A further object is providing a dismantling device for dismantling parts of a workpiece, which permits a flexible adaptation to changed requirements when processing workpieces.

A further object is providing a method for operating an installation which permits a flexible adaptation to changed requirements when processing workpieces.

The objects are achieved by the features of the independent claims. Advantageous embodiments and advantages of examples disclosed herein are found in the further claims, the description and the figures.

The features set forth in the claims can be combined together in a technologically expedient manner and can be supplemented by explanatory facts from the description and by details from the figures, wherein further variants of examples disclosed herein are shown.

According to one aspect of examples disclosed herein, a manipulation unit is proposed for horizontally and/or vertically moving a workpiece, the manipulation unit being, in particular, in the form of a driverless transport vehicle which is movable for its intended purpose over a floor, having wheels, a support frame and a workpiece receptacle fastened to the support frame.

The support frame is open on several sides and has a side opening for entry and/or exit of a separate manipulation unit and a bottom opening in the direction of the floor. An internal volume in which workpieces can be mounted, suspended and/or manipulated on the workpiece receptacle is formed inside the support frame.

The support frame can have at least one supporting column which is oriented, in particular, vertically. Preferably, a plurality of supporting columns, which are connected together via transverse struts, are provided. It is possible to provide for each supporting column one or more wheels by which the manipulation unit can be moved. A plurality of wheels arranged on a supporting column can form a wheel group and can be moved synchronously as a group, in particular can be rotatable about the column axis. At least some of the wheels can optionally be provided with contact protection, for example a cap, a grille and/or a sensor system which monitors the environment of the wheels. The sensor system can comprise, for example, LIDAR sensors.

The workpiece can be, in particular, a body or also denote parts of a body. The transport motor system can be activated, for example, via radio remote control, or alternatively a programmable drive can be present.

The wheels can have at least one all-side wheel and/or at least one omnidirectional wheel or a roller which is configured to be rotatable about the vertical axis. A drive of the wheels for moving the manipulation unit forward can be, for example, a wheel hub motor. A rotation of the wheel group about the axis of the respective supporting column can take place by means of one or two electric drives for each supporting column. Two drives are advantageous in order to limit the size of the arrangement.

The drives for the rotation of the wheel group can be provided with separate rotary encoders. The drives for the rotation can be advantageously operated in a synchronized manner.

A common drive can be coupled to the workpiece receptacle for lifting and/or lowering the workpiece receptacle and to the wheels for driving at least one wheel. Alternatively, separate drives can be present for driving the wheels and for the at least vertical movement of the workpiece.

Advantageously, the manipulation unit can specifically follow a predetermined path in the form of a driverless transport vehicle. This can be adapted, in particular, for example by programming, according to current boundary conditions and requirements.

Due to the workpiece receptacle being fastened to the support frame, it is possible to dispense with a hoist arranged on the ceiling of the production hall. Changes to the production process can be made in a flexible and rapid manner and without structural measures. Moreover, the static layout of the production hall can be simplified, which results in a financial saving in terms of building costs.

Advantageously, the manipulation unit can be a receiving manipulation unit into which other manipulation units can be at least partially immersed, in particular in order to transfer or take over workpieces or components. The support frame can advantageously have an upper part which is releasably connected to the supporting columns. This simplifies the transport and/or the storage of the manipulation unit. Advantageously, the workpiece receptacle can also be releasably connected to the upper part. Suitable releasable connections can be, for example, flange connections.

According to an advantageous embodiment of the manipulation unit, a plurality, in particular all, of the wheels in each case can have at least one electric motor, in particular a wheel hub motor. One electric motor can be present for each wheel or wheel group, in particular for each supporting column, for the drive of the wheel or the wheel group and for a rotation of the wheel or the wheel group about the vertical axis. The plurality of electric motors can be synchronized. The electric motor can optionally be configured in each case as a wheel hub motor. Alternatively, rather than individual electric motors, a central electric motor can be present with power transmission, drive shafts and the like. Alternatively, in each case a separate electric motor can be provided for the drive of a wheel and the rotation of the wheel or the wheel group about the vertical axis. At least one power storage device, in particular a rechargeable battery or a super capacitor, can be present for each manipulation unit. Optionally a separate computer unit can be present for each manipulation unit, via which sensor data can be evaluated.

A communication can take place with a central computer, as well as a command input and command output to actuating units, such as for example a hoist, electric motors and the like. A calculation/recalculation of trajectories, acceleration behavior and deceleration behavior of the manipulation unit can take place as a function of the workpiece to be transported, in particular the weight or dimensions thereof can be considered.

According to an advantageous embodiment of the manipulation unit, the workpiece receptacle can be configured to move, in particular to lift and/or to lower and/or to tilt and/or to rotate, the workpiece arranged therein by at least one degree of freedom. As a result, the workpiece can be made accessible at regions for an operator, without the need for costly pits above which the workpiece has to be positioned. This permits a flexible adaptation to production conditions.

In particular, an adjustment mechanism which has a common shaft for at least two flexible elements can be present for moving the workpiece receptacle. In particular, the flexible elements can be connected via deflection rollers to the workpiece receptacle.

According to an advantageous embodiment of the manipulation unit, the workpiece receptacle can be configured in the form of a hanger which hangs from the upper face of the support frame into an internal volume of the manipulation unit. The workpiece receptacle can be guided on at least one supporting column by a guide device. The guide device of the workpiece receptacle can slide along one or more supporting columns.

In particular, the guide device can have at least two guide rollers which are assigned to a supporting column and which bear against two different surfaces of the supporting column of the support frame. In particular, the guide device can have at least two pairs of guide rollers, the two guide rollers of each pair being arranged one on top of the other in a vertical direction and bearing against the same surface of a supporting column of the support frame, and in each case one of the pairs of guide rollers bearing against two different surfaces of a supporting column of the support frame.

If the guide device has one or more guide rollers, one or more guide rollers can roll on one or more supporting columns.

The guide device can effectively reduce, in particular minimize, an oscillating and/or pendulum movement of the workpiece receptacle during the start-up, driving, braking and/or cornering of the manipulation unit.

Advantageously, in an embodiment with pairs of guide rollers arranged one on top of the other in the vertical direction, an internal frame can be arranged between the guide rollers, said guide rollers being fastened thereto such that they at least partially protrude above and below the internal frame.

Alternatively or additionally to guide rollers, sliding surfaces can be provided. It is advantageous if the contact surface of the sliding surfaces is provided to be sufficiently long in the vertical direction.

Rather than a workpiece receptacle with such guide rollers or sliding surfaces as a guide device, alternatively a workpiece receptacle can be used with a height-adjustable scissors lift hanger. Moreover, in this alternative, an oscillating and pendulum movement is effectively reduced, in particular minimized.

According to an advantageous embodiment of the manipulation unit, the manipulation unit can be assigned a control system which is configured such that it coordinates a movement of the manipulation unit to movements of other manipulation units on the floor. A movement of the manipulation units can take place sequentially. For example, one manipulation unit can move at a distance behind the other. The manipulation units can follow a rectilinear and/or curved and/or serpentine path on the floor, wherein the control system can move the manipulation units continuously or discretely. Optionally the manipulation units can in principle also move freely, i.e. without following a path.

According to an advantageous embodiment of the manipulation unit, at least one sensor can be arranged on the support frame and configured such that it delivers to a control system a position, a speed, an orientation and/or a distance of at least one other manipulation unit. Sensors can be, for example, ultrasound sensors, infrared sensors, radar or LIDAR sensors.

In particular, the at least one sensor can be configured to monitor an environment when the manipulation unit turns, pulls out from a straight movement or is cornering.

According to an advantageous embodiment, the manipulation unit can have on its upper face an adjustment mechanism for the vertical movement of the workpiece receptacle with a drive.

The drive can, for example, lift and/or lower the workpiece receptacle by chains and/or toothed belts and/or belts and/or cables and/or push chains so that the workpiece receptacle preferably can move vertically upward and/or downward. Advantageously, the adjustment mechanism can at least lift and/or lower the workpiece receptacle with flexible elements in the form of chains and/or toothed belts and/or belts and/or cables and/or push chains, by means of a common shaft via deflection rollers.

According to a further aspect of examples disclosed herein, an installation is proposed having a group of manipulation units comprising at least one transfer region on which a transfer of a workpiece or one or more parts of the workpiece takes place from a first manipulation unit to a second manipulation unit. The first manipulation unit is designed as a receivable manipulation unit. The second manipulation unit is designed as a receiving manipulation unit with an internal volume which at least partially receives the receivable manipulation unit together with the workpiece or a part of the workpiece, in particular one or more add-on parts, in its internal volume.

The transfer region can be a fixed position or even a free route between two process stations. The parts of a workpiece can be parts of a body, for example doors and the like, or even one or more add-on parts, for example underbody, axles and the like.

Advantageously, the installation is suitable for manufacturing vehicles, wherein add-on parts can be assembled on a workpiece in the form of a vehicle body.

As the first receivable manipulation unit can be received at least partially in the internal volume of the second receiving manipulation unit, a transfer of workpieces between the manipulation units can take place therein.

According to an advantageous embodiment of the installation, a receiving manipulation unit, which at least partially receives a receivable manipulation unit in its internal volume, can be configured as a manipulation unit for horizontally and/or vertically moving a workpiece, the manipulation unit being, in particular, in the form of a driverless transport vehicle which is movable for its intended purpose over a floor, having wheels, a support frame and a workpiece receptacle fastened to the support frame. The support frame can be open on several sides and have a side opening for entry and/or exit of a separate manipulation unit and a bottom opening in the direction of the floor.

According to an advantageous embodiment of the installation, at least one of the manipulation units, in particular a receivable manipulation unit, can be configured as a driverless transport vehicle or as a stationary lifting platform. This permits a flexible and cost-effective arrangement of driverless transport vehicles or stationary lifting platforms. Alternatively or additionally to a lifting platform, a conveyor belt and/or a roller conveying unit or the like can be present. In particular, the installation can have a plurality of similar receiving manipulation units and a plurality of similar receivable manipulation units which in each case are also designed as driverless transport vehicles and can be activated via a common activation unit. Thus it is possible to design a fleet of transport vehicles which are interchangeable and interoperable.

Further preferably, the transport vehicles interact with a plurality of lifting platforms and/or conveyor belts and/or roller conveying units. With such a fleet of transport vehicles, a production plant can be designed for the assembly of large-volume, complex products such as motor vehicles.

According to an advantageous embodiment of the installation, an assembly of workpieces which are arranged so as to be distributed on at least two manipulation units can take place on at least one transfer region. The manipulation units can be placed as required relative to one another. In particular, a transfer of the workpieces can take place in the vertical direction, while the manipulation units are preferably movable in the horizontal direction relative to one another. Advantageously, an operator can handle and, for example, assemble the workpieces in ergonomically favorable conditions.

According to an advantageous embodiment of the installation, the internal volume of the receiving manipulation units can be at least as large as a volume of the receivable manipulation units plus the volume of the workpiece present during the transfer.

According to a further advantageous embodiment, at least a clear height and a clear width of the receiving manipulation units can be at least as great as the height and the width of the receivable manipulation units, plus the height and the width of the workpiece present in the transfer. The workpiece can protrude in the longitudinal direction on one side or both sides from the receiving manipulation units.

The receivable manipulation unit can be immersed together with the workpiece approximately fully into the internal volume. In this manner, a secure transfer of workpieces can take place between these manipulation units. Moreover, a receivable manipulation unit could be fixed inside a receiving manipulation unit, wherein both can be moved together by means of the receiving manipulation unit.

According to an advantageous embodiment of the installation, the receiving manipulation unit can have an opening for the entry and/or exit of the receivable manipulation unit, in particular with the workpiece which is arranged or can be arranged thereon.

Advantageously, the receivable manipulation unit can be moved into the receiving manipulation unit or the receiving manipulation unit can move over the receivable manipulation unit. As a result, movable and stationary manipulation units can be easily combined together. In a modified embodiment, the receiving manipulation unit has an opening for the entry and/or exit of a receivable manipulation unit and a further opening for the entry and/or exit of a receivable manipulation unit. The aforementioned openings are preferably arranged on opposing sides of the receiving manipulation unit.

According to an advantageous embodiment of the installation, the receiving and the receivable manipulation units can be arranged at least in some regions on a common travel plane. The receiving and receivable manipulation units can simply be moved as required toward one another and/or into one another.

According to an advantageous embodiment of the installation, the receiving manipulation unit can have a workpiece receptacle which protrudes over the receivable manipulation unit and the workpiece, in order to be able take over the workpiece and to hold it in a suspended manner. A vertical position of the workpiece in the receiving manipulation unit can be adjusted as required. The access to different regions of the workpiece can be made possible in a flexible and advantageous manner.

According to an advantageous embodiment of the installation, the workpiece receptacle can be configured in the form of a hanger which hangs from the upper face of the support frame into the internal volume of the manipulation unit. The workpiece receptacle can be guided on at least one supporting column by a guide device.

The hanger is advantageously protected thereby against oscillations in horizontal spatial directions. The guide device can have at least one sliding surface and/or at least one guide roller which bear against one or more outer surfaces of the at least one supporting column and/or have at least one frame which can encompass entirely or partially a supporting column over the periphery thereof.

In particular, an adjustment mechanism which has a common shaft for at least two flexible elements can be present for moving the workpiece receptacle, in particular wherein the flexible elements can be connected via deflection rollers to the workpiece receptacle. The flexible elements can be configured as belts, chains, cables or push chains.

According to an advantageous embodiment of the installation, the guide device can have at least two guide rollers or sliding surfaces which are assigned to a supporting column and which bear against two different surfaces of the supporting column of the support frame.

Optionally the guide device can have at least two pairs of guide rollers or sliding surfaces, the two guide rollers or sliding surfaces of each pair being arranged one on top of the other in the vertical direction and bearing against the same surface of a supporting column of the support frame, and in each case one of the pairs of guide rollers or sliding surfaces bearing against two different surfaces of a supporting column of the support frame.

Advantageously, the hanger is particularly well stabilized relative to oscillations in horizontal spatial directions.

Advantageously, in an embodiment with pairs of guide rollers arranged one on top of the other in the vertical direction, an internal frame can be arranged between the guide rollers, said guide rollers being fastened thereto, such that they at least partially protrude above and below the internal frame.

Sliding surfaces can be provided alternatively or additionally to guide rollers. It is advantageous if the contact surface of the sliding surfaces is provided to be sufficiently long in the vertical direction. Rather than a pair of sliding surfaces, optionally a sliding surface of sufficient length can be provided.

According to an advantageous embodiment of the installation, the receiving manipulation unit can have an opening toward the floor through which the workpiece located in the manipulation unit is accessible from the floor. An operator can maintain access to the workpiece in an ergonomically advantageous position from below. Alternatively or additionally, a movable manipulation unit can engage from below in the receiving manipulation unit or the receiving manipulation unit can be positioned above a stationary or movable receivable manipulation unit. In this manner, a workpiece can be transferred between the manipulation units in the vertical direction.

According to an advantageous embodiment of the installation, the receiving manipulation unit can have at least three, in particular four, supporting columns which can roll with one or more wheels on the floor and between which the workpiece receptacle can be arranged. This permits a particularly stable design of the support frame. In particular, at least some of the wheels can have a contact protection. The contact protection can comprise, for example, a cap or a grille which at least partially cover the wheels and/or a sensor unit which monitors the environment of the wheels. The sensor unit can comprise, for example, LIDAR sensors.

Advantageously, the contact protection can also be configured as a touch-sensitive element which upon contact can cause a signal for stopping the manipulation unit.

According to an advantageous embodiment of the installation, at least one of the manipulation units can be configured as a movable base which is open toward the floor. This permits a vertical arrangement of receivable manipulation units in a receiving manipulation unit, in particular for the transfer of workpieces or for the manipulation of workpieces.

According to an advantageous embodiment of the installation, at least one of the receiving manipulation units can be configured with opening access points for a receivable manipulation unit. Opening access points can be present in the sides or in the floor of the receiving manipulation unit.

According to an advantageous embodiment of the installation, the receiving manipulation unit can have an adjustment mechanism for moving a workpiece relative to a receivable manipulation unit. Thus a flexible positioning of the workpiece as required is possible for different processing steps.

According to an advantageous embodiment of the installation, a receivable manipulation unit can have an adjustment mechanism for moving a workpiece relative to a receiving manipulation unit. A flexible positioning of the workpiece as required is possible for different processing steps.

According to an advantageous embodiment of the installation, in particular a first transfer region can be present for the transfer of parts, in particular doors of the workpiece, in particular a body, from a transport path to a receivable manipulation unit, in particular configured as a self-propelled transport vehicle, with a holder for the parts of the workpiece and for the transfer of the workpiece, in particular a body, from the transport path to a receivable manipulation unit.

Alternatively or additionally, in particular a second transfer region can be present for the transfer of the workpiece, in particular a body, from the receivable manipulation unit to a receiving manipulation unit, in particular for equipping the interior and attaching components, in particular windows.

Alternatively or additionally, in particular a third transfer region can be present for the transfer of a component to be attached to the workpiece, in particular the underbody, from a receivable manipulation unit to the receiving manipulation unit with the workpiece, in particular for further assembly of the workpiece and components.

Alternatively or additionally, in particular a fourth transfer region can be present for the transfer of the workpiece from the receiving manipulation unit to a receivable manipulation unit, in particular for producing connections and cladding. Alternatively or additionally, in particular a fifth transfer region can be present for the transfer of the workpiece from the receivable manipulation unit to a floor platform, in particular for moving through a test station.

Alternatively or additionally, in particular a sixth transfer region can be present for the transfer of the workpiece from the floor platform to a receivable manipulation unit, in particular for carrying out functional tests.

Alternatively or additionally, in particular a seventh transfer region can be present for the transfer of the workpiece from a receivable manipulation unit to a floor platform and the transfer to a receiving manipulation unit, in particular for separating a series of successive receivable manipulation units into at least two parallel process lines.

Alternatively or additionally, in particular an eighth transfer region can be present for the transfer of the workpiece from a receiving manipulation unit to a floor platform, in particular for carrying out leak tests.

Alternatively or additionally, in particular a ninth transfer region can be present for the transfer of the finished workpiece from a floor platform to a floor transport belt, in particular for providing the finished workpiece to a dispatch line.

Advantageously, the transfer regions can be arranged in a sequence which is coordinated for a production, in particular a vehicle production.

According to an advantageous embodiment of the installation, receiving manipulation units and/or receivable manipulation units can be arranged at least in some regions on different levels. For example, receiving manipulation units can be moved at least in some regions on a raised platform and receivable platforms on a level located therebelow.

Advantageously, for example, parts of a workpiece can be transported on a receivable manipulation unit on a level below the level on which the workpiece is moved in a receiving manipulation unit. The transport of the parts of the workpiece can take place independently of the transport of the workpiece.

According to an advantageous embodiment of the installation, process stations can be surrounded at least in some regions by walls which can be at least temporarily opened for the self-propelled receiving manipulation units. Thus these manipulation units can be moved through these one or more process stations. Sensors or light barriers can be present in order to open a wall, or corresponding through-holes can be present.

According to a further aspect of examples disclosed herein, an installation having a plurality of manipulation units is proposed. At least one of the manipulation units is configured as a driverless transport vehicle without a lifting function, in particular for receiving and for transporting doors and/or separate prefabricated workpieces for a body. Alternatively or additionally, at least one of the manipulation units is configured as a driverless transport vehicle with a lifting function, in particular for receiving and for transporting a body and/or separate prefabricated workpieces for a body. Alternatively or additionally, at least one of the manipulation units is configured as a driverless transport vehicle for horizontally and/or vertically moving a workpiece which is movable for its intended purpose over a floor, having wheels, a support frame and a workpiece receptacle fastened to the support frame, wherein the support frame is open on several sides and has at least one side opening for entry and/or exit of a separate manipulation unit and a bottom opening in the direction of the floor.

Advantageously the respective design of the manipulation units can be adapted flexibly and as required.

According to an advantageous embodiment of the installation, three types of manipulation units can be present in each case with a plurality of tasks which in total represent essential tasks of an entire production, in particular a production of vehicles.

Advantageously, one type can be a manipulation unit for horizontally and/or vertically moving a workpiece, the manipulation unit being, in particular, in the form of a driverless transport vehicle which is movable for its intended purpose over a floor, having wheels, a support frame and a workpiece receptacle fastened to the support frame. The support frame is open on several sides and has a side opening for entry and/or exit of a separate manipulation unit and a bottom opening in the direction of the floor. A different type of manipulation unit can be configured as a driverless transport vehicle without a lifting function. A different type of manipulation unit can be configured as a driverless transport vehicle with a lifting function. Optionally a stationary lifting platform can also be provided. Further optionally, a conveyor belt and/or roller conveying unit can be provided as manipulation units.

According to a further aspect of examples disclosed herein, a manipulation unit for receiving parts of a workpiece is proposed, in particular for receiving doors of a body during a production process, with a holder which receives parts of the workpiece. Advantageously, the parts of the workpiece can be processed and tested in the manipulation unit. Advantageously, the manipulation unit can take over exactly the parts of the workpiece which are to be supplied again later to the workpiece in a processed state.

Optionally the manipulation unit can be configured as a driverless transport vehicle.

According to an advantageous embodiment of the manipulation unit, the holder can be designed to permit a movement of the parts of the workpiece as intended. In particular, the holder can permit a pivoting of doors of a body. Thus the holder can permit an opening and closing of the doors.

According to an advantageous embodiment of the manipulation unit, this can serve for storing the parts of the workpiece, in particular for storing doors of a body. A cost-effective manipulation unit can be provided in which the holder is configured without the pivoting function.

Optionally the manipulation unit can be configured as a driverless transport vehicle. The processed parts, in particular doors, can be transported with this manipulation unit to the workpiece, in order to be combined therewith again.

According to a further aspect of examples disclosed herein, a dismantling device is proposed for dismantling parts of a workpiece, in particular for dismantling doors of a body during a production process of a vehicle, with a transfer region for a workpiece, in particular a body, from a transport device to a receivable manipulation unit for receiving the workpiece and a receivable manipulation unit, in particular for receiving parts of the workpiece on different levels.

Thus parts of the workpiece which have to be subjected to less complex processing than the workpiece can be processed and transported in a space-saving manner independently of the workpiece itself.

According to an advantageous embodiment of the dismantling device, at least one robot can be arranged on the transfer region in the range of the receiving manipulation unit and the receivable manipulation unit. The positioning can be adapted in a simple manner to the possible robot range.

According to an advantageous embodiment of the dismantling device, the at least one robot can be arranged on vertical rails. A dismantling of the parts of the workpiece, in particular a dismantling of doors of a body, can take place in a space-saving manner and a vertical free space can be utilized.

According to an advantageous embodiment of the dismantling device, the at least one robot can be arranged on a hoist. A dismantling of the parts of the workpiece, in particular a dismantling of doors of a body, can take place in a space-saving manner and a vertical free space can be utilized.

According to a further aspect of examples disclosed herein, a method for operating an installation is proposed, wherein two manipulation units are moved relative to one another such that the one manipulation unit as a receivable manipulation unit at least partially protrudes into the other manipulation unit as a receiving manipulation unit, wherein in a further method step a workpiece is transferred between the manipulation units.

According to an advantageous embodiment of the method, a self-propelled transport vehicle, a conveyor belt, and/or a roller conveying unit and/or stationary lifting platform can be used as manipulation units. In a preferred embodiment of the method, a plurality of similar self-propelled transport vehicles are used, preferably in order to form a fleet of self-propelled transport vehicles which are preferably interoperative and/or can be activated together and which in turn cooperates with other manipulation units.

A workpiece is transferred from one manipulation unit to another manipulation unit and passed through a production or assembly process. Different workpieces and/or subassemblies are also combined spatially by means of different manipulation units, wherein the workpieces and/or subassemblies are assembled and/or joined later by means of robots and/or a human workforce to form larger subassemblies.

According to an advantageous embodiment of the method, a transfer of the workpiece from a receivable manipulation unit to a receiving manipulation unit can take place by at least one of the two manipulation units being moved such that the receivable manipulation unit can be at least partially arranged in or below the receiving manipulation unit. In particular, the receivable manipulation unit can travel in or below the receiving manipulation unit. When transferring the workpiece or parts of the workpiece to a conveyor belt as a receivable manipulation unit, the receiving manipulation unit can travel over the receivable manipulation unit when this has a support frame, or below the receivable manipulation unit when this is configured as a lifting carriage. This permits a flexible arrangement and design of process stations.

According to an advantageous embodiment of the method, a manipulation unit can move toward a workpiece, in particular a vehicle underbody, to a conveyor belt and/or a roller conveying unit and/or a lifting platform and transfer the workpiece to the conveyor belt and/or the roller conveying unit and/or the lifting platform. In this manner, self-propelled manipulation units can cooperate with stationary manipulation units.

According to an advantageous embodiment of the method, a receiving manipulation unit can be moved via the lifting platform and/or the conveyor belt and/or the roller conveying unit, such that the lifting platform and/or the conveyor belt and/or the roller conveying unit is received at least partially with the workpiece in an internal volume of the receiving manipulation unit. A safe and accurate transfer of the workpiece can take place.

According to an advantageous embodiment of the method, a transfer of the workpiece, in particular an underbody, can take place by means of the lifting platform and/or the conveyor belt and/or the roller conveying unit to the receiving manipulation unit and a workpiece arranged therein, in particular a body. A combining of the workpieces arranged on the two manipulation units can take place in an ergonomic and positionally accurate manner.

According to an advantageous embodiment of the method, a transfer of a workpiece, in particular a body, can take place such that the receiving manipulation unit travels over a receivable manipulation unit. The workpiece can thus be transferred from the receivable manipulation unit to the receiving manipulation unit. This can take place as required.

According to an advantageous embodiment of the method, the manipulation units can be moved apart after a workpiece has been transferred. A manipulation unit or all of the manipulation units can be designed to be movable. This can be adapted in a flexible manner as required to a process station or a free space present.

According to an advantageous embodiment of the method, a receivable manipulation unit can move into a receiving manipulation unit at one point and/or move out again at a different point, in particular on a different side and/or at a different time. This can be adapted in a flexible manner and as required to a process station or a free space present.

According to an advantageous embodiment of the method, a dismantling of parts of the workpiece, in particular doors of the workpiece, in particular the body, can take place on a dismantling device. Thus parts of the workpiece which have to be subjected to less complex processing than the workpiece can be processed independently of the workpiece itself and transported or stored in a space-saving manner.

According to an advantageous embodiment of the method, for dismantling the parts, the workpiece can be placed in the range of at least one robot; wherein the at least one robot can be moved on one or more vertical rails. Alternatively or additionally, the at least one robot can be moved on a hoist.

According to an advantageous embodiment of the method, a change of level between the parts of the workpiece on the manipulation unit thereof and the workpiece on the manipulation unit thereof can take place during the dismantling of the parts of the workpiece and the transfer thereof to a manipulation unit and the transfer of the workpiece to a further manipulation unit. In particular, the manipulation unit can be moved with the parts of the workpiece below the level on which the manipulation unit is located with the workpiece. Vertical free spaces can be advantageously used in a production plant.

BRIEF DESCRIPTION OF THE DRAWINGS

Further advantages are found in the following description of the drawing. Exemplary embodiments of examples disclosed herein are shown in the figures. The figures, the description and the claims contain numerous features in combination. The person skilled in the art will also expediently consider the features individually and combine them to form further meaningful combinations.

By way of example

DETAILED DESCRIPTION OF THE DRAWINGS

Components which are the same or have the same function are denoted by the same reference signs in the figures. The figures show merely examples and are not to be understood as limiting.

Before examples disclosed herein are described in detail, it should be mentioned that it is not limited to the respective components of the device and the respective method steps since these components and methods can vary. The terms used herein are merely intended to describe particular embodiments and are not used in a limiting manner. If the singular or indefinite article is used in the description or in the claims this also refers to a plural of these elements, provided the overall context does not clearly indicate otherwise.

Directional terminology used hereinafter, with terms such as “left”, “right”, “top”, “bottom”, “front” “behind”, “downstream” and the like, merely serves for improved understanding of the figures and in no way is to represent a limitation of the generality. The components and elements shown, the layout and use thereof, can be varied according to the considerations of a person skilled in the art and can be adapted to the respective applications.

Figure 1:
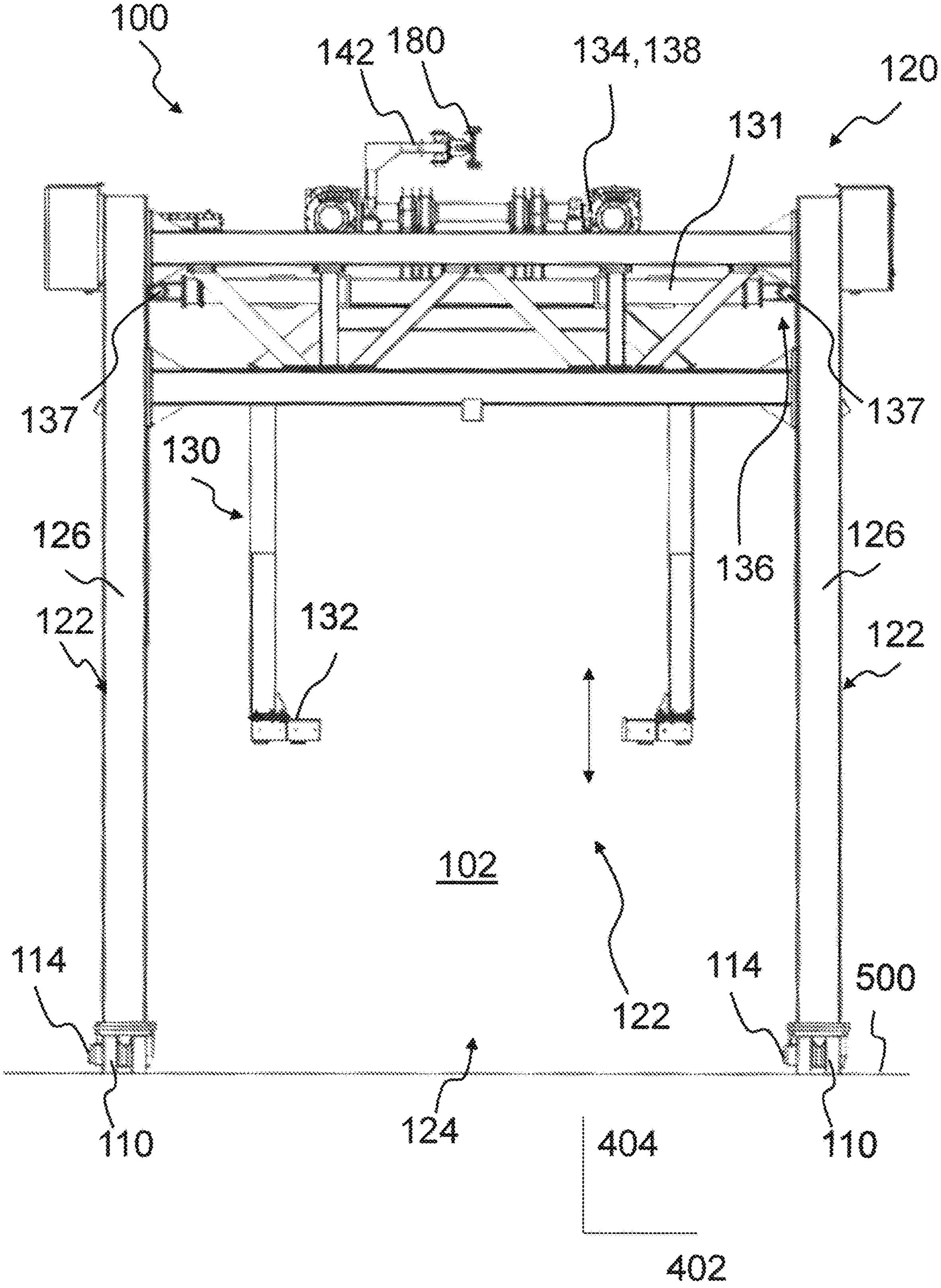
FIG. 1 shows in a front view a receiving manipulation unit according to an exemplary embodiment of examples disclosed herein in the manner of a driverless transport vehicle in contact with a media rail.

FIG. 1 shows in a front view a receiving manipulation unit 100 according to an exemplary embodiment of examples disclosed herein in the manner of a driverless transport vehicle with a support frame 120, a pick-up 142 which extends in the vertical direction 404 from the upper face thereof and which is at least temporarily in contact with an external media rail 180 on the installation side. The media rail 180 can advantageously serve for transmitting, for example, power and/or data. In this exemplary embodiment, the media rail 180 is oriented vertically so that the pick-up 142 acts on the media rail 180 from the side.

The receiving manipulation unit 100 can move by means of a wheel group having rollers or wheels 110 in the longitudinal direction 400, which in this case is oriented perpendicularly to the drawing plane. To this end a drive 114, in particular a wheel hub motor, is arranged on the wheel group. The wheel group is arranged on supporting columns 126 of the support frame 120. If the wheel group is rotated, the manipulation unit 100 can move in the transverse direction 402 so that the manipulation unit 100 can pull away from a rectilinear movement in the direction of the longitudinal direction 400 and also can travel around corners.

Figure 2:
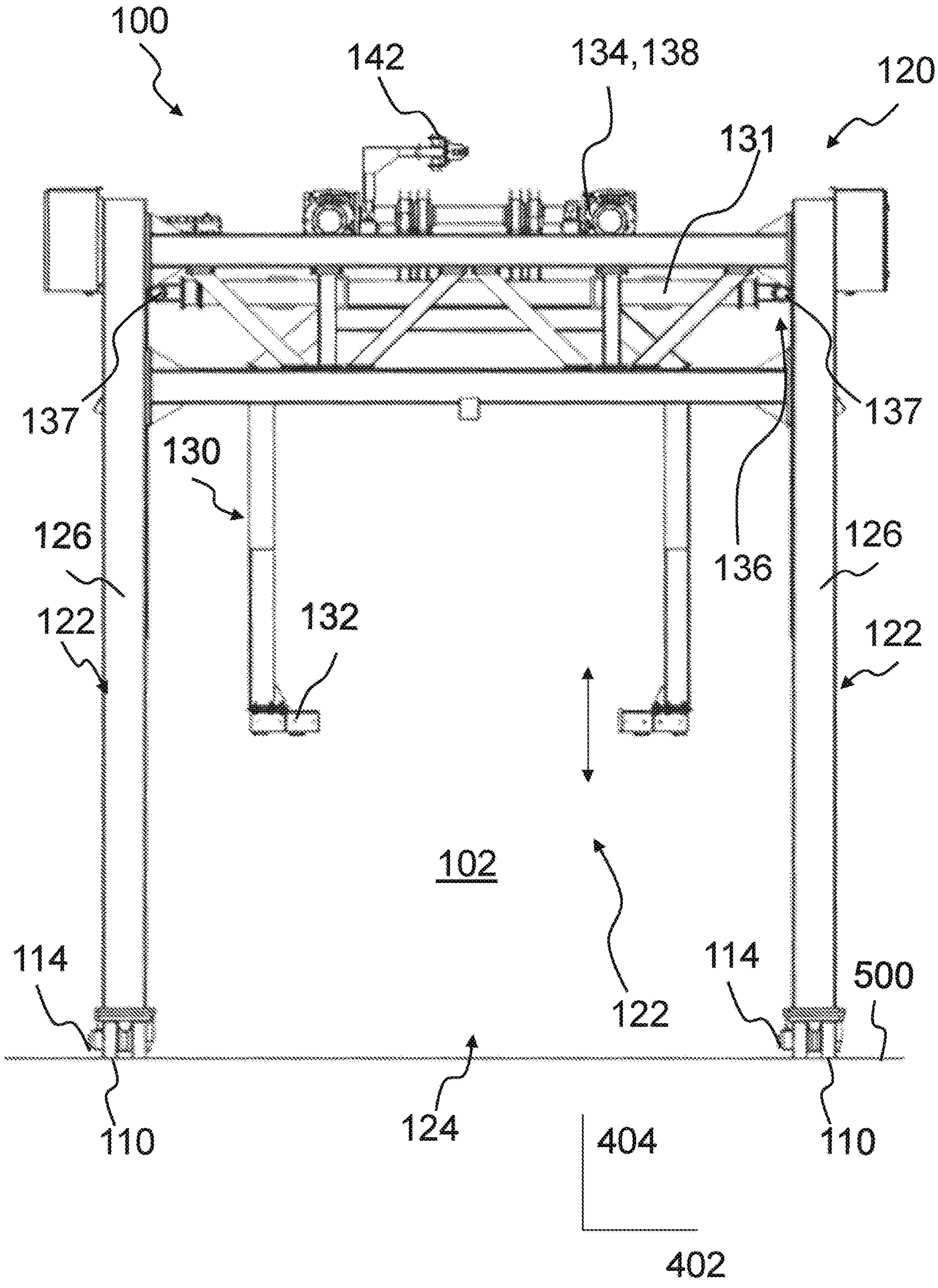
FIG. 2 shows in a front view a receiving manipulation unit according to an exemplary embodiment of examples disclosed herein in the manner of a driverless transport vehicle without contact with a media rail.

FIG. 2 shows in a front view a receiving manipulation unit 100 in the manner of the exemplary embodiment of FIG. 1, wherein the manipulation unit 100, however, does not have the contact of the pick-up 142 with a media rail on the upper face thereof. In this case, a power supply can be provided independently by means located on board, in particular by at least one energy storage device located on the manipulation unit 100, for example a rechargeable battery and/or a super capacitor. A data transmission can take place, for example, by radio.

In particular, on the manipulation unit 100 it is possible to switch from a power supply via the media rail 180 to an independent power supply on board the manipulation unit 100 when this pulls away from a linear movement along the media rail 180, carries out a reversal movement and the like, in which the pick-up 142 is no longer in contact with the media rail 180.

Optionally the receiving manipulation unit 100 can also be configured entirely without the pick-up 142 and can be exclusively operated independently by a power supply on board the receiving manipulation unit 100.

The receiving manipulation unit 100 in this example is configured for horizontally and vertically moving a workpiece (not shown) which is movable for its intended purpose over a floor 500. The manipulation unit 100 has a support frame 120 with, for example, four supporting columns 126 and a workpiece receptacle 130 fastened to the support frame 120.

The workpiece receptacle 130 hangs in the form of a hanger from the upper face of the support frame 120 into the internal volume 102 of the manipulation unit 100 and comprises, for example, two successive U-shaped elements in the longitudinal direction 400, each U-shaped element thereof having shelves 132 protruding inwardly. The U-shaped elements are connected to an internal frame 131, wherein the connection to the internal frame 131 can be designed to be releasable, for example as a flange connection.

The workpiece receptacle 130 bears with a guide device 136 against the supporting columns 126. The guide device 136 is designed here in the form of pairs of guide rollers 137 which face in different horizontal directions so that in each case a guide roller 137 bears against an outer surface of each supporting column 126. In this manner, the hanger is advantageously protected from oscillations in horizontal spatial directions.

The manipulation unit 100 has on its upper face an adjustment mechanism 134 for the vertical movement of the workpiece receptacle 130 transversely to a longitudinal direction 400, with a drive. The drive can lift and/or lower the workpiece receptacle 130, for example with chains and/or toothed belts and/or belts and the like, so that the workpiece receptacle 130 can preferably move vertically upward and/or downward. The guide rollers 137 of the guide device 136 roll on the supporting columns 126. An oscillating and/or pendulum movement of the workpiece receptacle 130 can be effectively reduced, in particular minimized, thereby during the start-up, moving, braking and/or cornering of the manipulation unit 100. The guide rollers 137 are arranged on the corners of the internal frame 131 to which the workpiece receptacle 130 is connected. In this exemplary embodiment, in each case two guide rollers 137 are arranged on one respective supporting column 126 at the corner and are supported on different surfaces of the respective supporting column 126.

The movement of the workpiece receptacle 130 in the vertical direction 404 is indicated by a double arrow.

Rather than a workpiece receptacle 130 with such a guide device 136, alternatively a workpiece receptacle can be used with a height-adjustable scissors lift hanger.

Moreover, at least one energy storage device (not shown) can be arranged on the upper face of the manipulation unit 100, such as a rechargeable battery or a super capacitor.

The media rail 180 on the installation side can be used for data transmission and, if required, as a power supply during a linear operation of the manipulation unit 100, when the pick-up 142 is in contact with the media rail 180. The at least one energy storage device can be used in a turning region or for offset travel or travel transversely to the longitudinal direction 400, since then the pick-up 142 is not in contact with the media rail 180.

The workpiece 700 in the workpiece receptacle is always arranged below the upper face of the manipulation unit 100.

The workpiece receptacle 130 can be configured to be hook-shaped so that shelves 132 are present on vertical limbs for receiving the workpiece, the workpiece being able to be deposited thereon and optionally fixed thereto.

The workpiece can be, in particular, a vehicle body or parts of a vehicle body or add-on parts on a vehicle body.

Wheels 110, which in this example form in each case a wheel group for each supporting column 126, are arranged on each supporting column 126. Each wheel group comprises two wheels 110 in the form of rollers. The wheel group is rotatable as a whole about a vertical axis. In particular, a rotation can take place in an angular range of between 0° and 90° about the vertical axis. With a rotatability of 90° instead of 360° it is advantageously possible to move the manipulation unit 100 in all directions, wherein at the same time a cable routing, for example for transmitting power and/or data, can be provided in a simple manner from the supporting column 126 into the wheel group.

In a modified exemplary embodiment, at least one wheel 110 or one roller has a friction drive and/or a friction brake, wherein a friction element is arranged adjacent to the wheel 110 or roller and drives and/or brakes this via friction on its outer periphery.

In an alternative exemplary embodiment, not shown, at least one wheel 110 can be designed as all-side wall and/or omnidirectional wheel.

The support frame 120 is configured to be open on several sides and has on all four sides a side opening 122 for an entry and/or exit of a separate manipulation unit (not shown) and a bottom opening 124 toward the floor 500. A workpiece deposited in the workpiece receptacle 130 is advantageously accessible from all sides.

An activation of the transport motor system can take place, for example, via radio remote control, or alternatively by a programmable drive.

The manipulation unit 100 has an adjustment mechanism 134 for moving the workpiece in the support frame 120. Separate drives 138, 114 can be arranged on the support frame 120 for lifting and/or lowering the workpiece receptacle 130 and for driving at least one of the wheels 110. Optionally a common drive can be provided for a vertical and a linear movement or even a tilting movement of the workpiece in the support frame 120.

A plurality, in particular all, of the wheels 110 can have in each case at least one electric motor, in particular wheel hub motor, as a drive 114. In particular, one electric motor can be present for each wheel or wheel group of each supporting column 126 for the drive of the wheel 110 and for the rotation of the wheel 110 about the vertical axis. Optionally at least one wheel 110 can be driven and/or braked by means of a friction drive and/or a friction brake, in which a friction element acts on the outer periphery and drives and/or brakes the wheel 110 by means of friction.

The plurality of electric motors can be synchronized. Alternatively, rather than individual electric motors a central electric motor can be present with power transmission via drive shafts. Alternatively, a separate electric motor can be provided in each case for the drive of a wheel 110 and the rotation of the wheel 110 about the vertical axis. At least one power storage device, in particular a rechargeable battery and/or one or more super capacitors, can be present for each manipulation unit 100.

Optionally each manipulation unit 100 can have a dedicated computer unit (not shown) via which sensor data can be evaluated and/or a communication can be made with a central computer, a command input and command output to actuating units such as workpiece receptacle 130, hoist, wheel motors, and a calculation/recalculation of trajectories on which the manipulation unit 100 is designed to move. A travel speed, an acceleration behavior and/or deceleration behavior of the manipulation unit 100 can also be calculated and monitored as a function of the workpiece to be transported and/or on the energy content of the power storage device, for example the travel speed, the acceleration behavior and deceleration behavior as a function of the weight or the dimensions of the workpiece and/or the energy capacity of the power storage device.

The workpiece receptacle 130 is configured to move, in particular to lift and/or to lower and/or to tilt and/or to rotate, the workpiece 700 arranged therein by at least one degree of freedom.

An operator (not shown) or even a tool can stand and work on the floor 500 adjacent to, or even in, the manipulation unit 100. Optionally the manipulation unit 100 can also have a work platform above the floor 500. In this case, a workpiece can be processed in a suitable position, depending on the adjusted height or tilt of the workpiece receptacle. Optionally a simultaneous accessibility to two different levels is possible.

One or more sensors are arranged on the support frame 120 and configured to deliver to a control system a position, a speed, an orientation and/or a distance of the manipulation unit 100 and/or at least one other manipulation unit 100, 200, 300.

Advantageously an LCD screen (not shown) which serves as human-machine interface can be arranged on the support frame 120. The operator can obtain by the information displayed therein a real-time monitoring of the workpiece 700 in the manipulation unit 100.

Moreover, lighting elements, in particular LEDS, can be attached to the support frame 120. These lighting elements can illuminate processes inside and/or in the immediate environment of the support frame 120, so that the need for fixed lights outside the support frame 120 is at least reduced.

Figure 3:
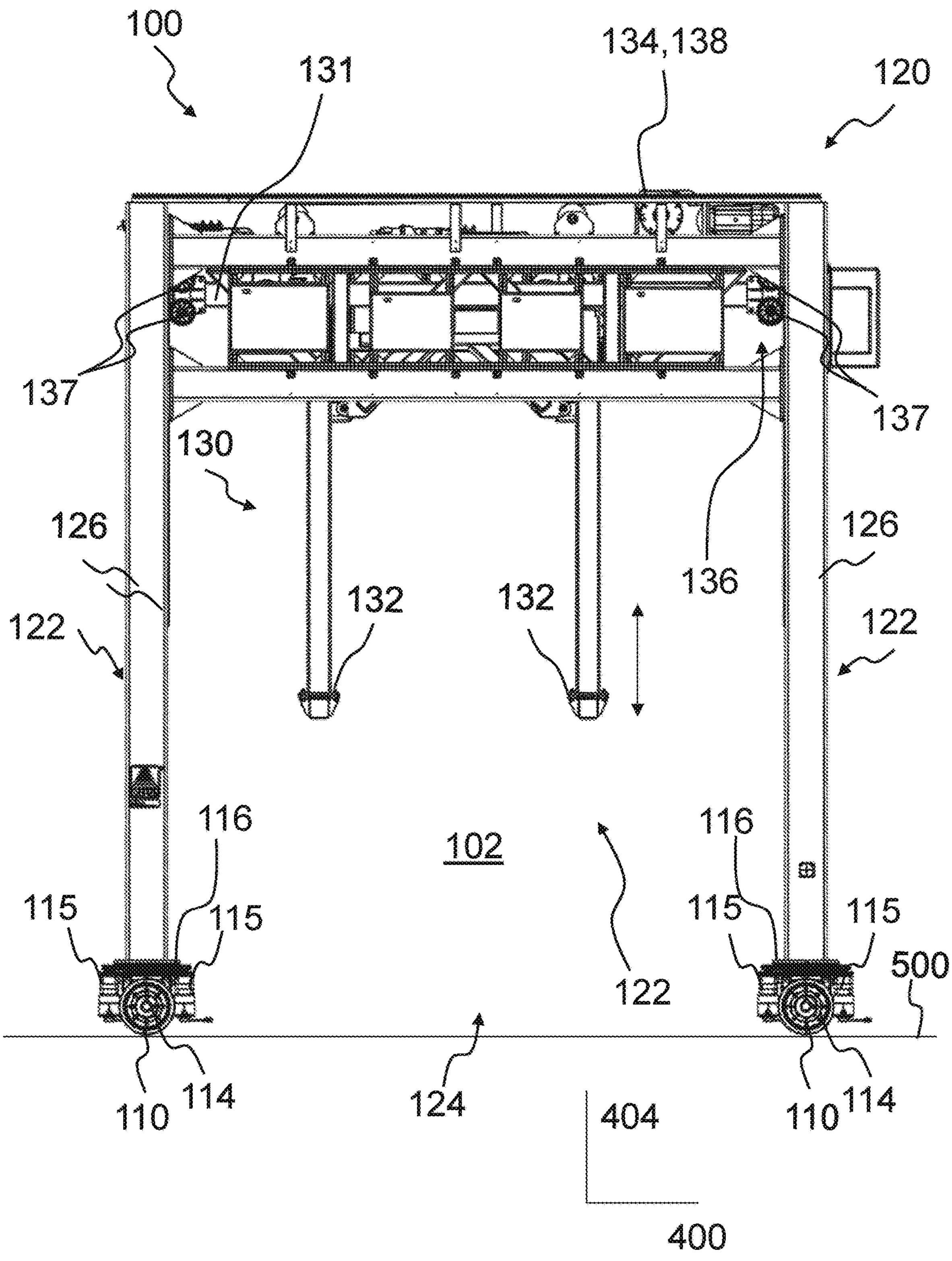
FIG. 3 shows in a side view a receiving manipulation unit according to an exemplary embodiment of examples disclosed herein without contact with a media rail with two drive motors for rotating a wheel group of a supporting column.

FIG. 3 shows in a side view a receiving manipulation unit 100 according to an exemplary embodiment of examples disclosed herein which is provided on its supporting columns 126 with drive motors 115 for rotating a wheel group having rollers or wheels 110. In this view, the transverse direction 402 (FIGS. 1, 2) is oriented perpendicularly to the drawing plane. The manipulation unit 100 is shown without the pick-up on the upper face.

In this exemplary embodiment, two vertical drives 115 are arranged on each supporting column 126, said vertical drives having on their upper face in each case a gear wheel which meshes with a gear wheel 116 of the supporting column 126 when a rotation of the wheel group is to take place. The rollers or wheels 110 themselves have a drive 114, in particular in the form of a wheel hub motor, for a movement of the manipulation unit 100.

The manipulation unit 100 has on its upper face an adjustment mechanism 134 for the vertical movement of the workpiece receptacle 130 transversely to a longitudinal direction 400, with a drive 138. The drive 138 can lift and/or lower, for example, the workpiece receptacle 130 by chains and/or toothed belts and/or belts and the like, so that the workpiece receptacle 130 can preferably move vertically upward and/or downward in the vertical direction 404. The guide rollers 137 of a guide device 136 roll on the supporting columns 126. An oscillating and/or pendulum movement of the workpiece receptacle 130 can be reduced, in particular minimized, thereby during the start-up, traveling, braking and/or cornering of the manipulation unit 100.

As in the above exemplary embodiment, the guide rollers 137 are arranged on corners of the internal frame 131 to which the workpiece receptacle 130 is connected. In this exemplary embodiment, in each case a pair of guide rollers 137, which are arranged one on top of the other in the vertical direction, is provided approximately at the level of the internal frame 131, so that they bear against the same surface of the supporting columns 126 of the support frame 120. A different pair of guide rollers 137, which are arranged one on top of the other in the vertical direction 404, bears against a different surface of the supporting column 126 of the support frame 120. The two pairs of guide rollers 137 are arranged at the corner, i.e. they bear against adjoining side surfaces of the supporting column 126.

Figure 4:
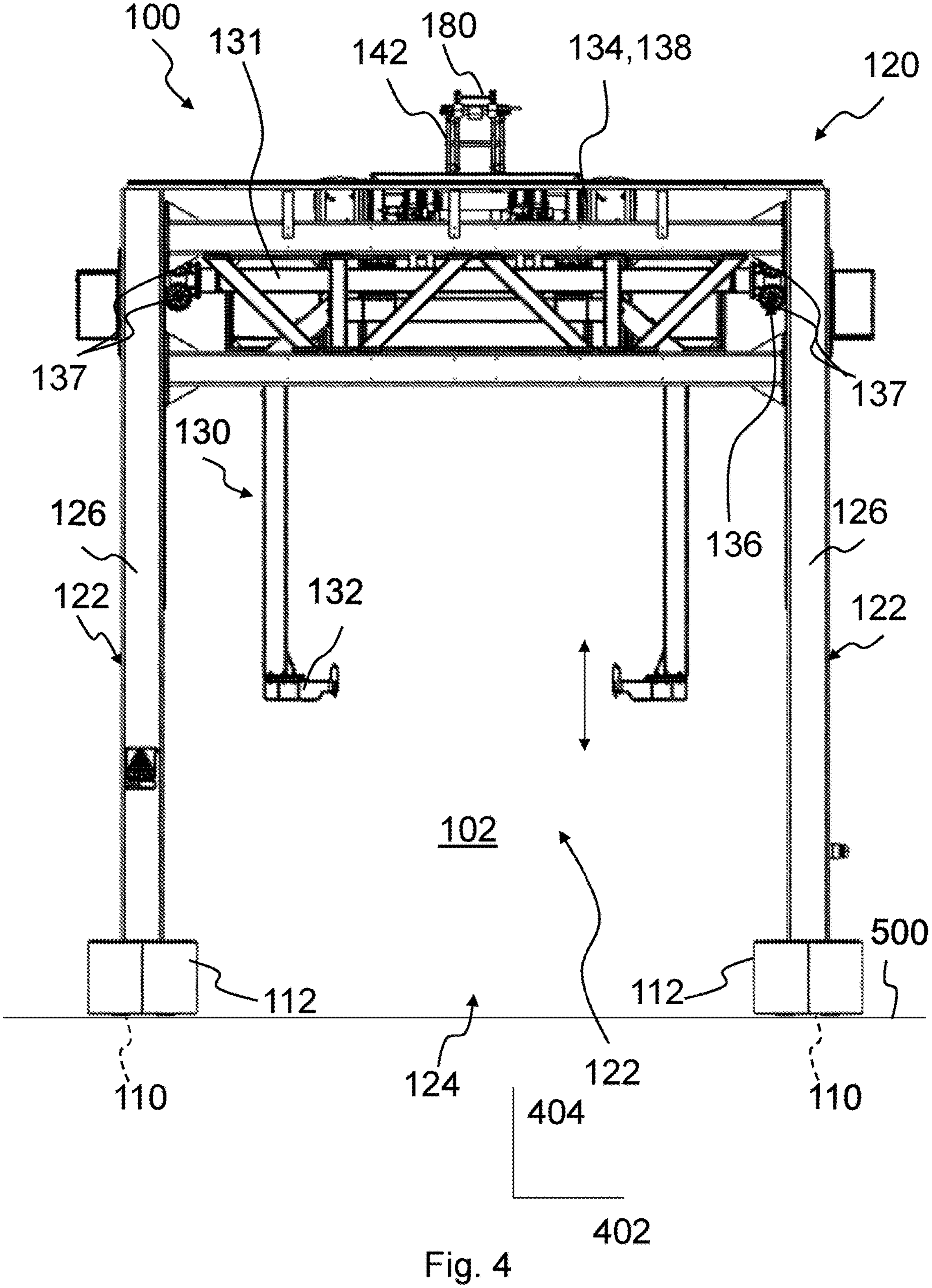
FIG. 4 shows in a front view a receiving manipulation unit according to an exemplary embodiment of examples disclosed herein with wheel groups which are provided with a contact protection.

FIG. 4 shows in a front view a receiving manipulation unit 100 similar to the manipulation unit in FIG. 3, according to an exemplary embodiment of examples disclosed herein with wheel groups which are provided with a contact protection 112, for example in the form of a cover.

Advantageously, the contact protection 112 can also be configured as a touch-sensitive element which upon contact with the contact protection 112 can cause a signal for stopping the manipulation unit 100.

A pick-up 142 which is in contact with a media rail 180 can be identified on the upper face of the support frame 120. The media rail 180 can advantageously serve for transmitting power and/or data, for example. In this exemplary embodiment, the media rail 180 can be arranged horizontally so that the pick-up 142 can bear from below against the media rail 180.

The guide device 136 can also have pairs of guide rollers 137 which are arranged one on top of the other in the vertical direction 404 and which act in each case at the corner on different adjoining surfaces of the supporting columns 126.

Figure 5:
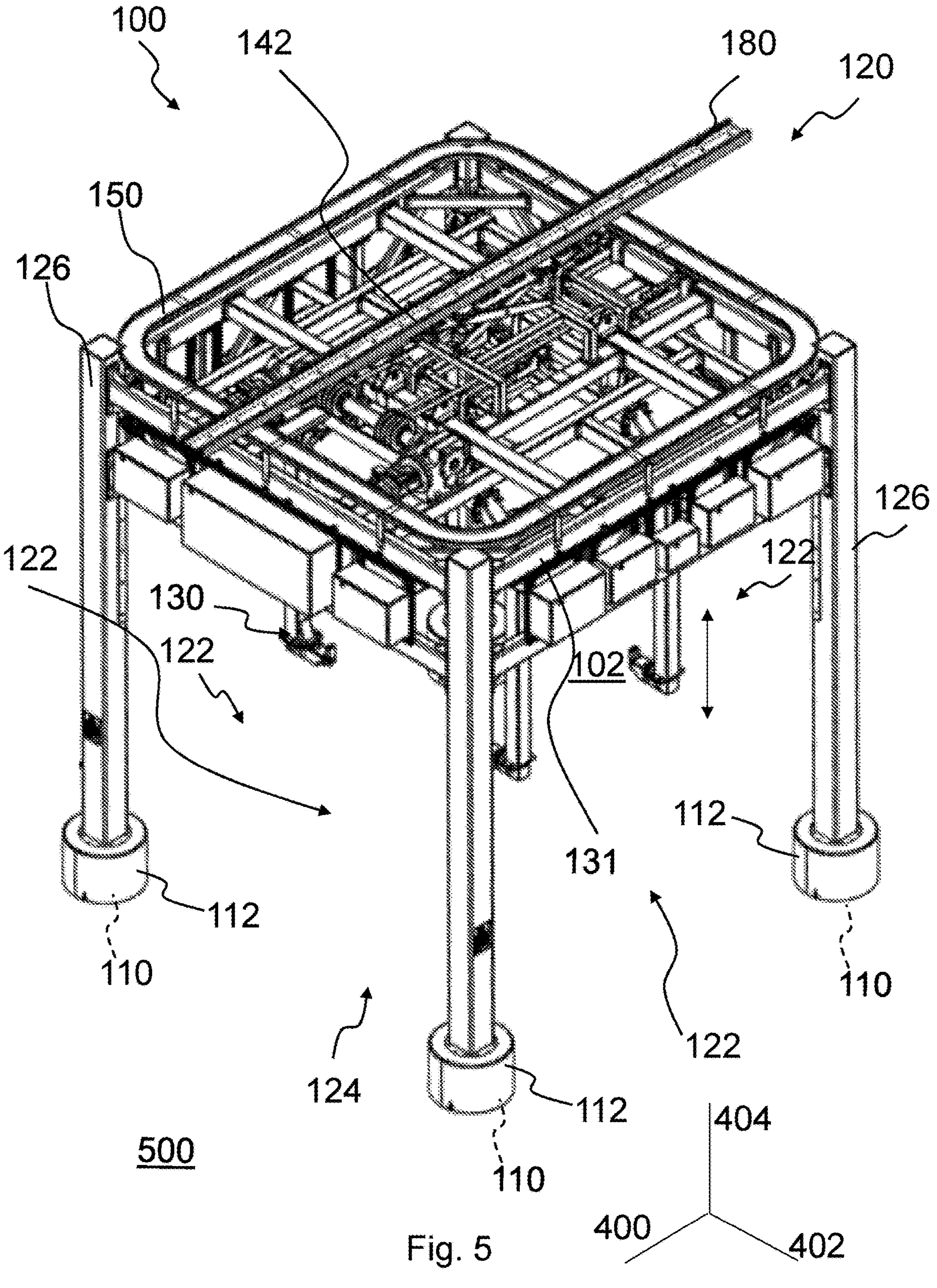
FIG. 5 shows in a perspective plan view the receiving manipulation unit according to FIG. 4 with a pick-up in contact with an external media rail.
Figure 6:
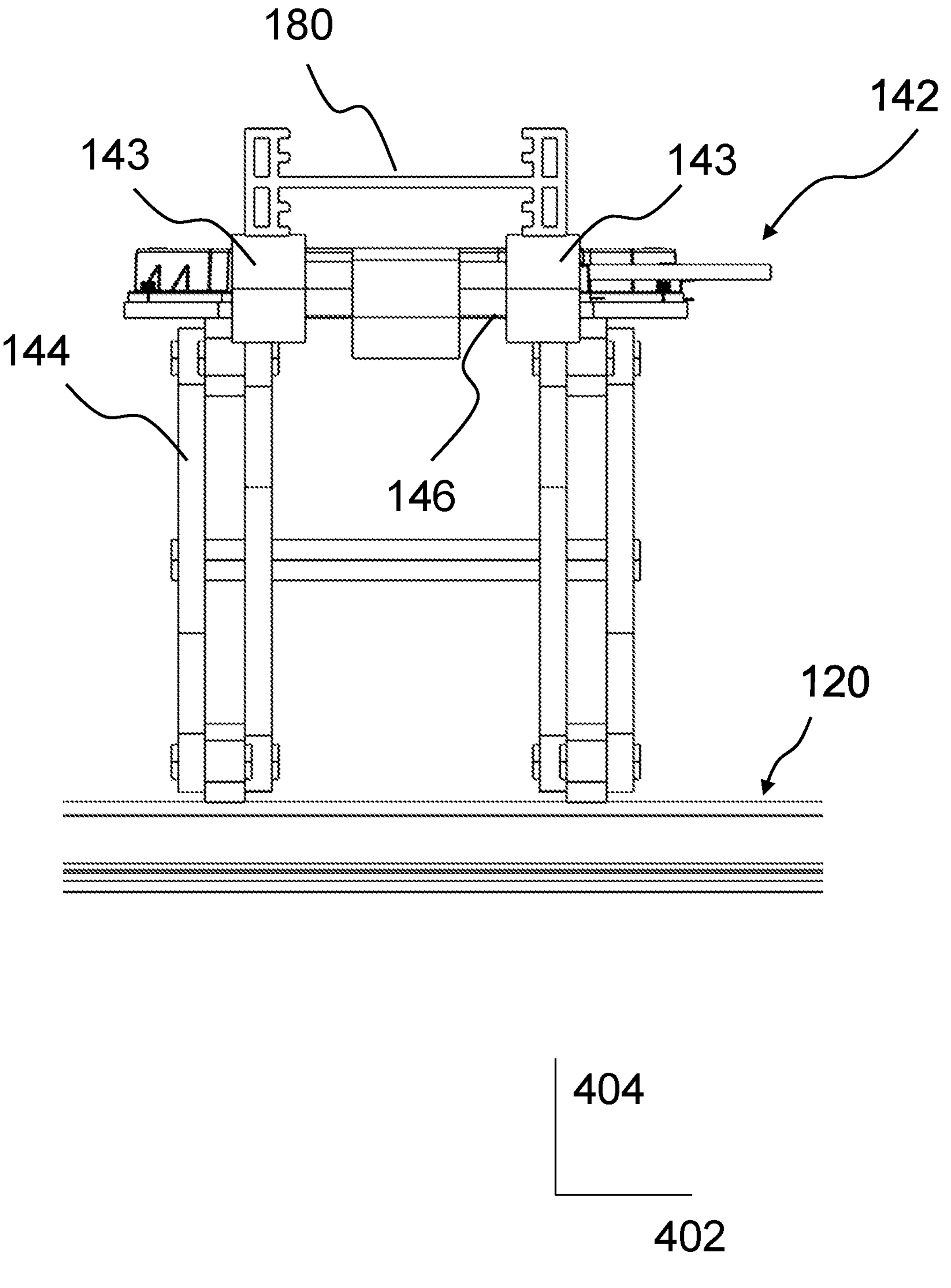
FIG. 6 shows in a front view the pick-up according to FIG. 5 in contact with the external media rail.
Figure 7:
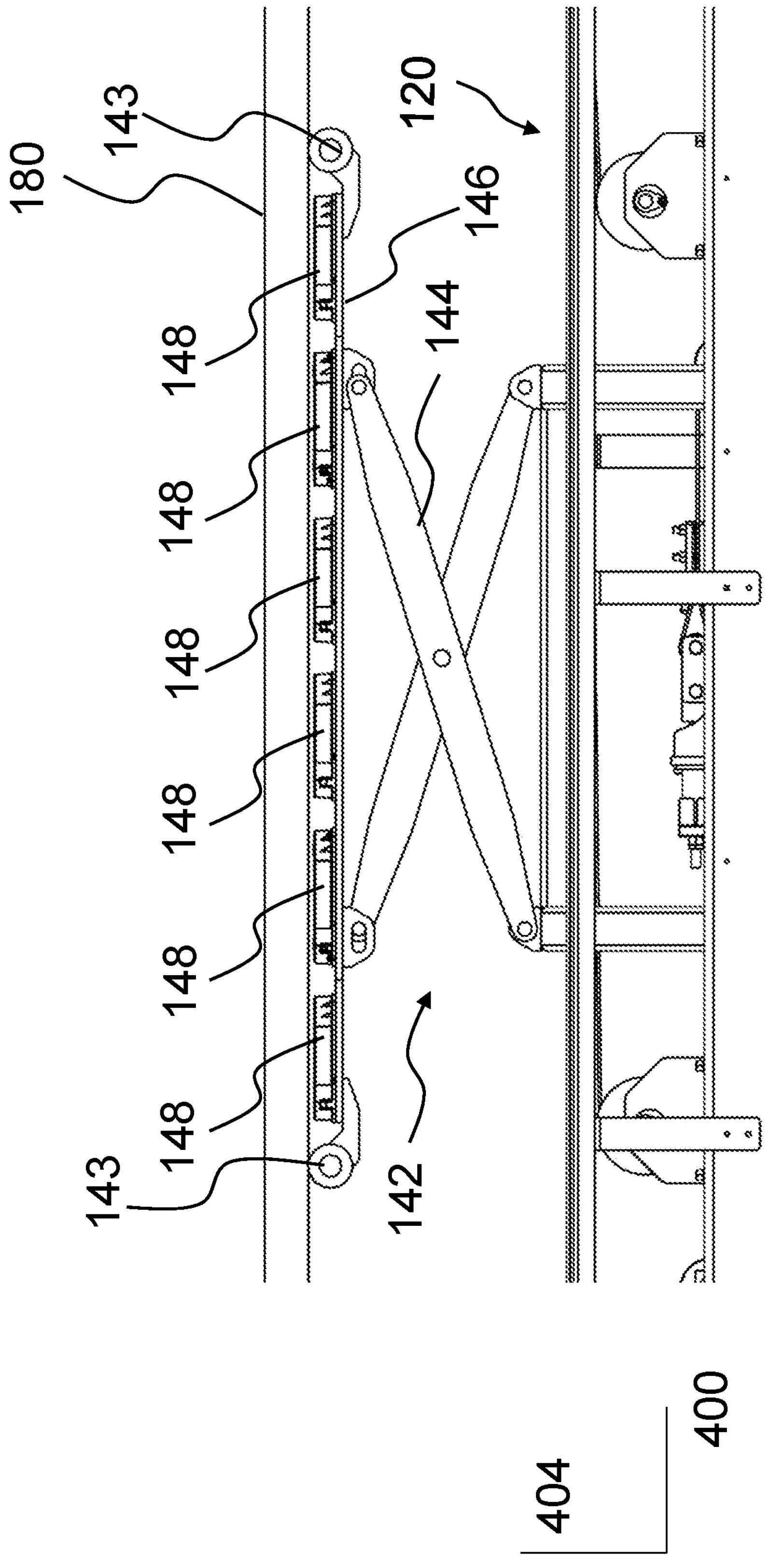
FIG. 7 shows in a side view the pick-up according to FIG. 5 in contact with the external media rail.

FIG. 5 shows in a perspective plan view the receiving manipulation unit 100 according to FIG. 4 with a pick-up 142 in contact with an external media rail 180. The media rail 180 is only shown in some portions. FIG. 6 shows in a front view the pick-up 142 according to FIG. 5 in contact with the external media rail 180. FIG. 7 shows in a side view the pick-up 142 according to FIG. 5 in contact with the external media rail 180.

The pick-up 142 is horizontally oriented and guided by rollers 143 on the media rail 180. The pick-up 142 acts from below on the media rail 180. A holder 146 extends between the rollers 143, flat coils 148 being arranged thereon adjacent to one another. These coils serve for inductive power transmission from the media rail 180 to the manipulation unit 100.

The holder 146 with the rollers 143 is pressed by a scissors device 144 against the media rail 180. The scissors device 144 can ensure that a distance which is as small as possible can be maintained between the media rail 180 and the coils 148 in the operating state. The scissors device 144 can be actuated up and down in the vertical direction 404 by an electrical drive. If required, for example in the event of a power failure, the scissors device 144 can be manually actuated, in particular lowered.

Figure 8:
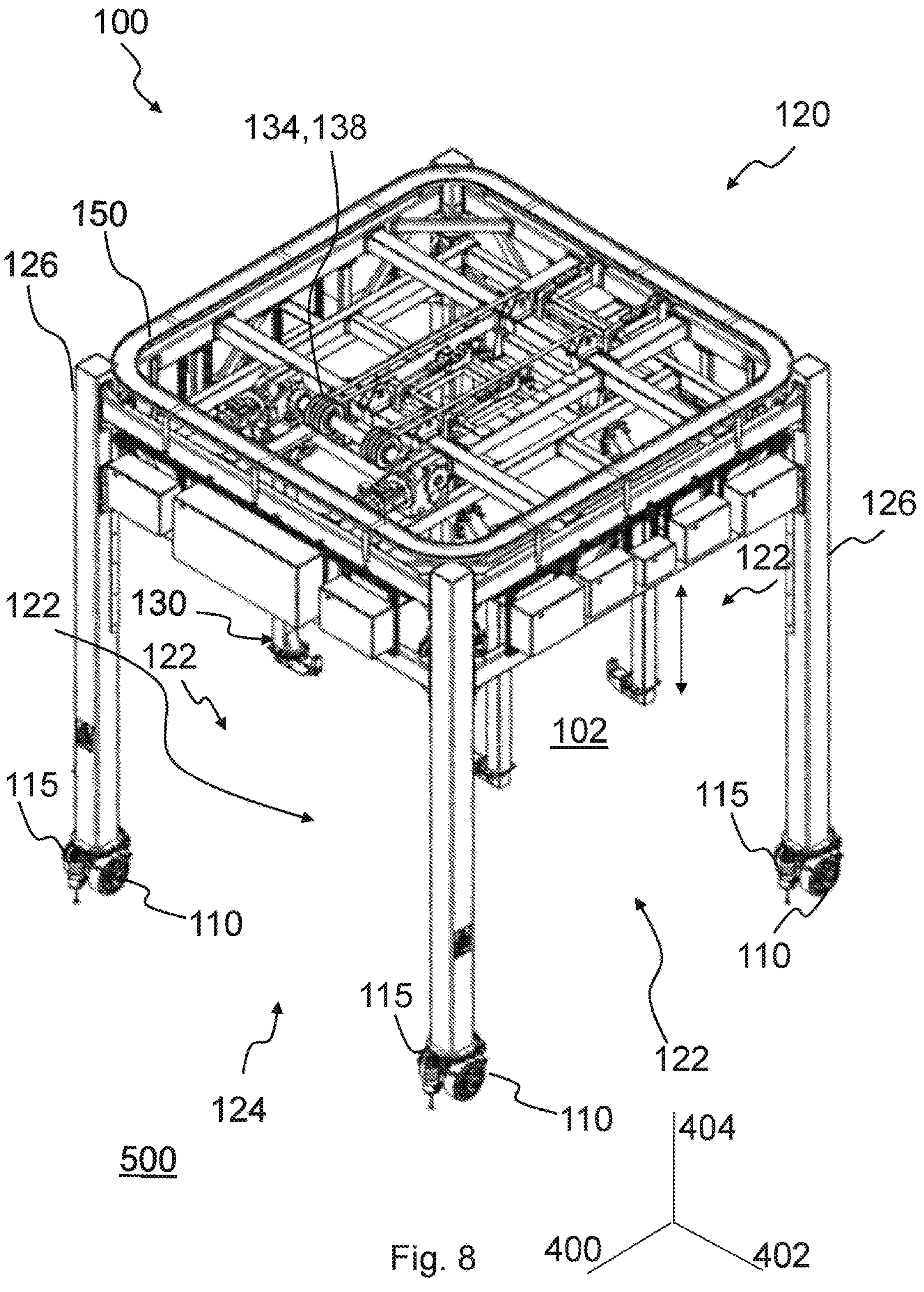
FIG. 8 shows in a perspective plan view a receiving manipulation unit according to an exemplary embodiment of examples disclosed herein without the pick-up.
Figure 9:
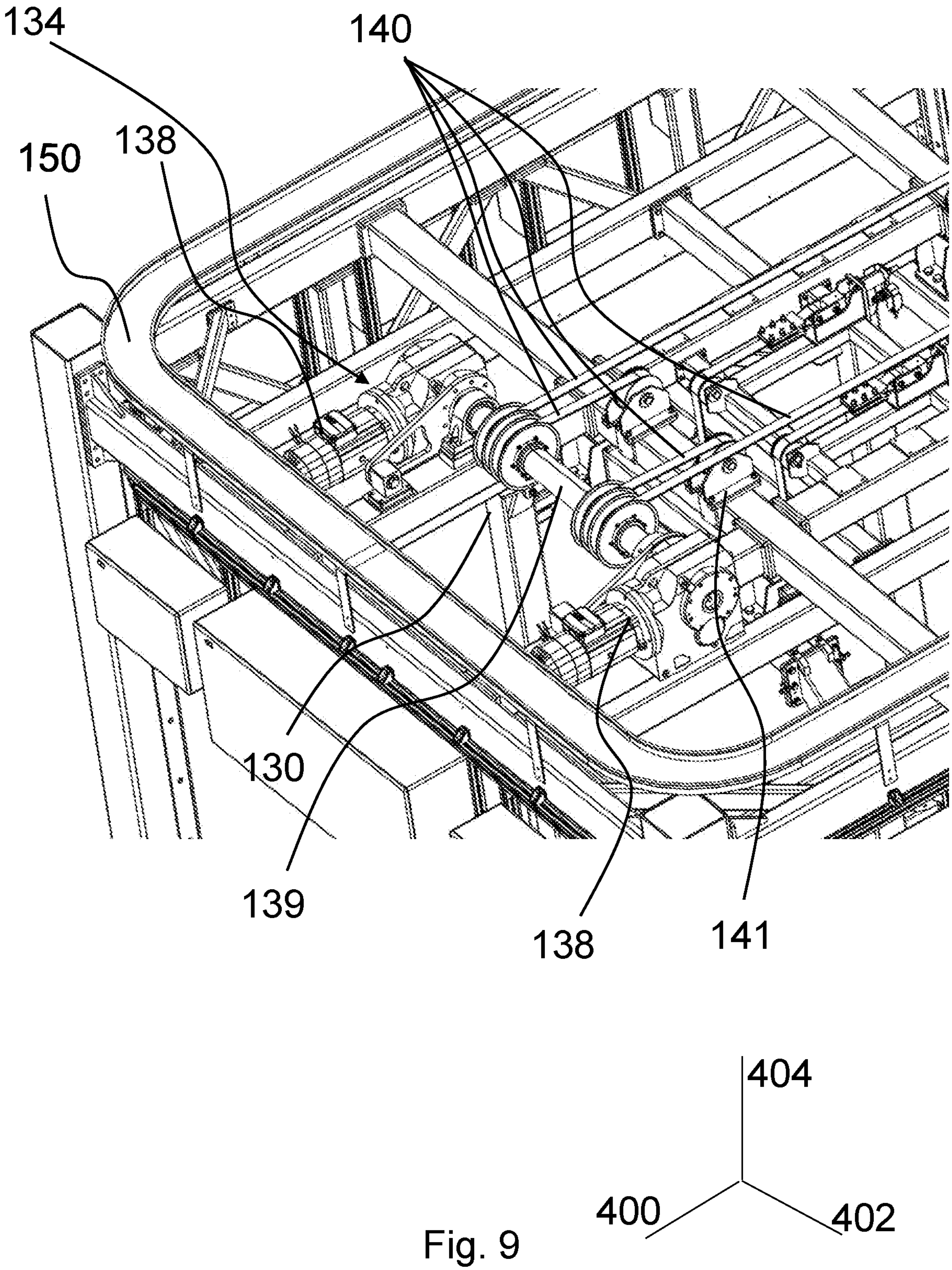
FIG. 9 shows in a perspective plan view a detail of a receiving manipulation unit according to an exemplary embodiment of examples disclosed herein with an adjustment mechanism for a workpiece receptacle.

FIG. 8 shows in a perspective plan view a receiving manipulation unit 100 according to an exemplary embodiment of examples disclosed herein in the manner of a manipulation unit in the manner of FIG. 5, for the sake of clarity without a pick-up 142. FIG. 9 shows in a perspective plan view a detail of the receiving manipulation unit 100 according to FIG. 8 with the adjustment mechanism 134 for a workpiece receptacle 130.

The adjustment mechanism 134 has a common shaft 139, a roller pair, not denoted further, being arranged in each case on the two ends thereof in order to wind or unwind four parallel flexible elements 140, for example in the form of belts, cables, toothed belts, push chains and the like, by rotation. These flexible elements 140 are guided via deflection rollers and are connected in pairs to the workpiece receptacle 130. Two drives 138 are arranged at both ends of the common shaft 139. A circulating cable duct 150 can be identified on the upper face of the support frame 120.

Optionally, an upper part of the support frame 120 can be releasably connected to the supporting columns 126, which simplifies transport and storage.

Figure 10:
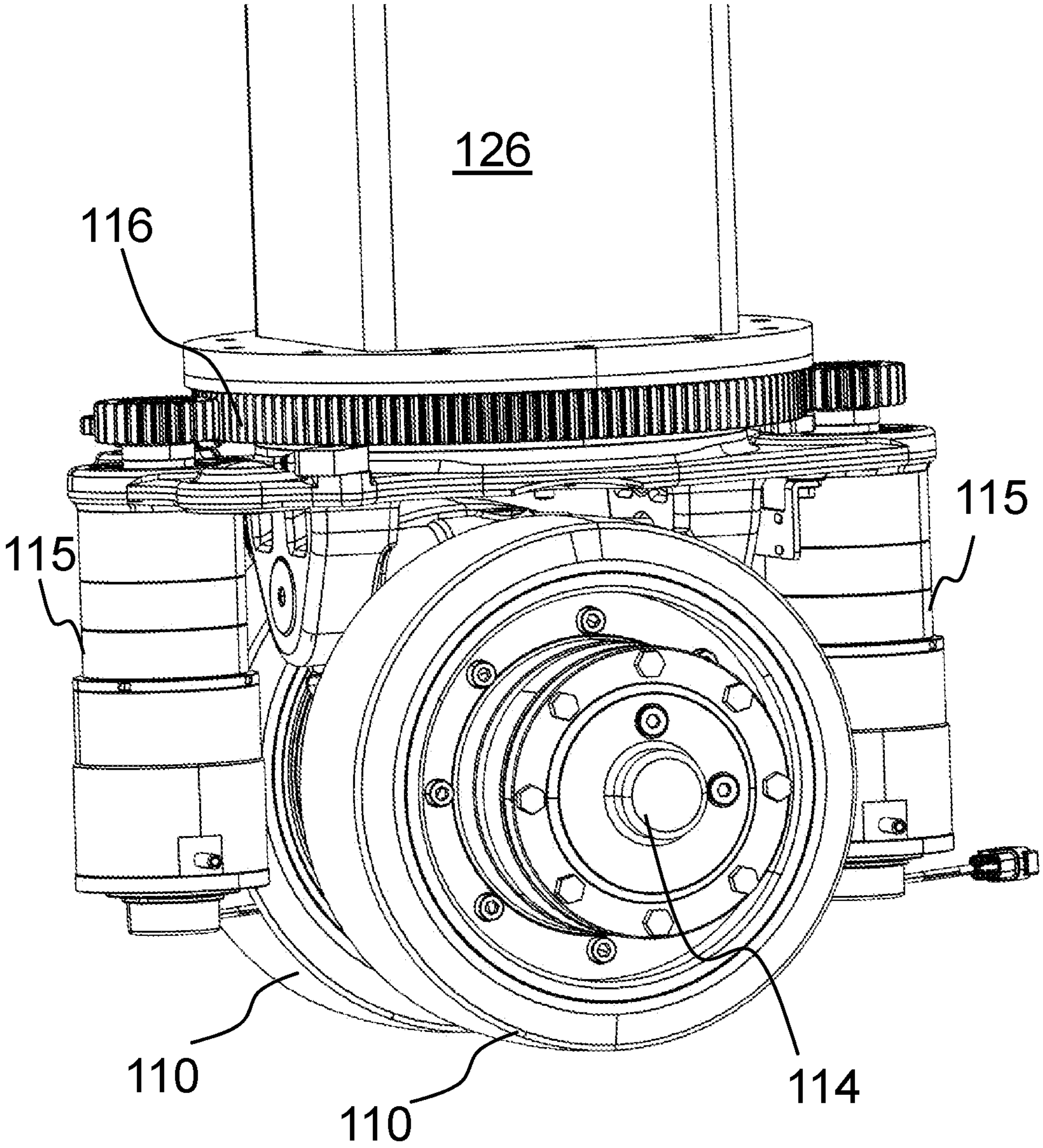
FIG. 10 shows in a perspective view a detail of a wheel group of a receiving manipulation unit according to an exemplary embodiment of examples disclosed herein with two drives for a rotational movement of the wheel group.

FIG. 10 shows in a perspective view a detail of a wheel group of a receiving manipulation unit 100 according to an exemplary embodiment of examples disclosed herein, with two vertically arranged drives 155 for a rotation of the wheel group about the axis of the supporting column 126. The wheel group has two wheels 110 which are arranged in parallel and which can be rotated by a drive 114, in particular a wheel hub motor. The two drives 115, for example electric motors, which are arranged vertically on both sides of the wheels 110, have on their upper front faces gearwheels, not denoted further, which mesh with a gearwheel 116 when the wheel group is to be rotated. The drives 115 operate, in particular, in a synchronized manner with one another.

As two drives 115 are present, they can be designed overall to be smaller than if only one drive 115 were to be present, so that the entire wheel group having the drives 114, 115 can be of a relatively small size.

Figure 11:
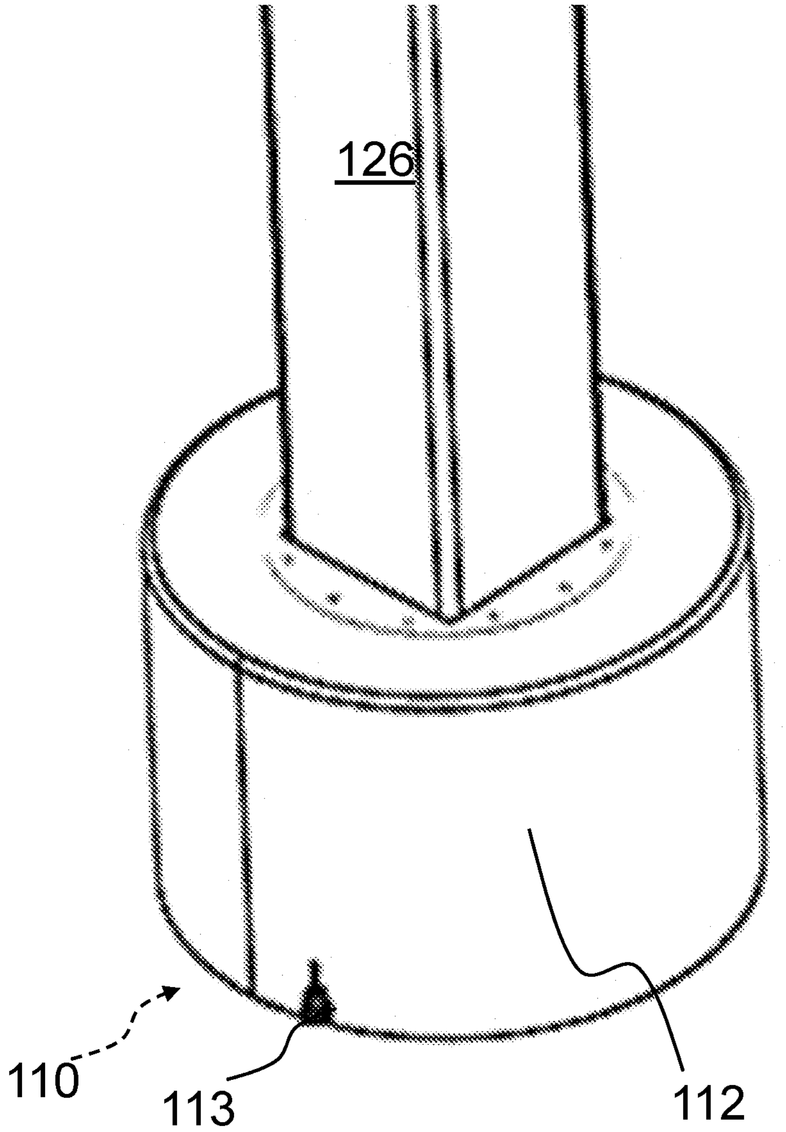
FIG. 11 shows in a perspective view a detail of a wheel group with a contact protection of a receiving manipulation unit according to an exemplary embodiment of examples disclosed herein.

FIG. 11 shows in a perspective view a detail of a wheel group on a supporting column 126 of a receiving manipulation unit 100 with a contact protection 112 according to an exemplary embodiment of examples disclosed herein. The contact protection 112 in this exemplary embodiment is designed as a solid cover. Alternatively, the cover can be configured as a grille or mesh. This permits a ventilation of the drives of the wheel group. Alternatively, the wheel group can be open and monitored by a sensor unit, in particular by LIDAR sensors. This is particularly advantageous for monitoring an environment, in order to avoid collisions when the manipulation unit 100 travels around corners or performs a 180° U-turn.

The contact protection 112 can have at least one sensor 113, namely a microswitch and/or a photo cell, in order if required to brake the manipulation unit 100 if a collision is imminent. Optionally the contact protection 112 can also be configured as a touch-sensitive element which upon contact with the contact protection 112 can cause a signal for stopping the manipulation unit 100.

Figure 12:
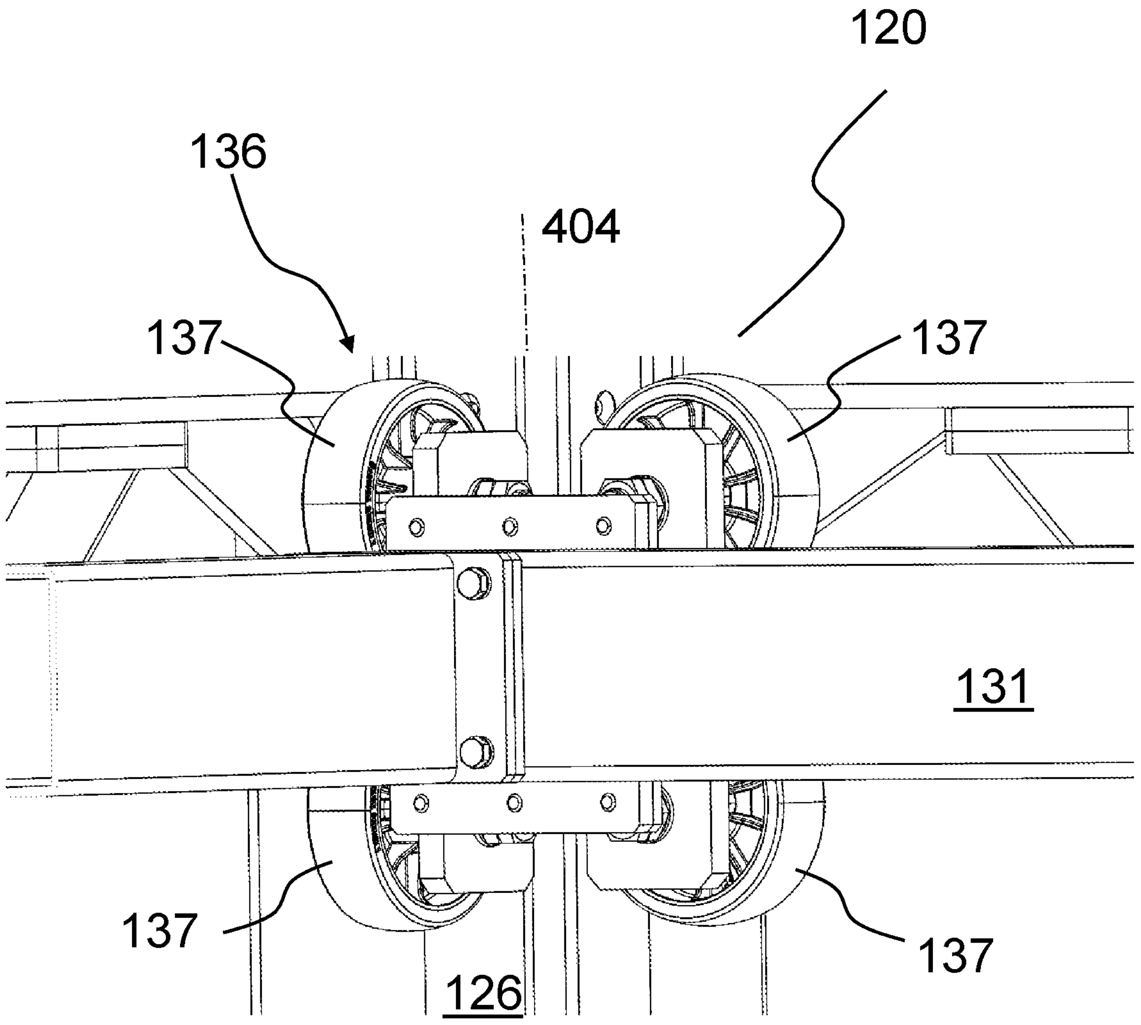
FIG. 12 shows in a front view a detail of a guide device with in each case two guide rollers arranged one on top of the other of a receiving manipulation unit according to an exemplary embodiment of examples disclosed herein.
Figure 13:
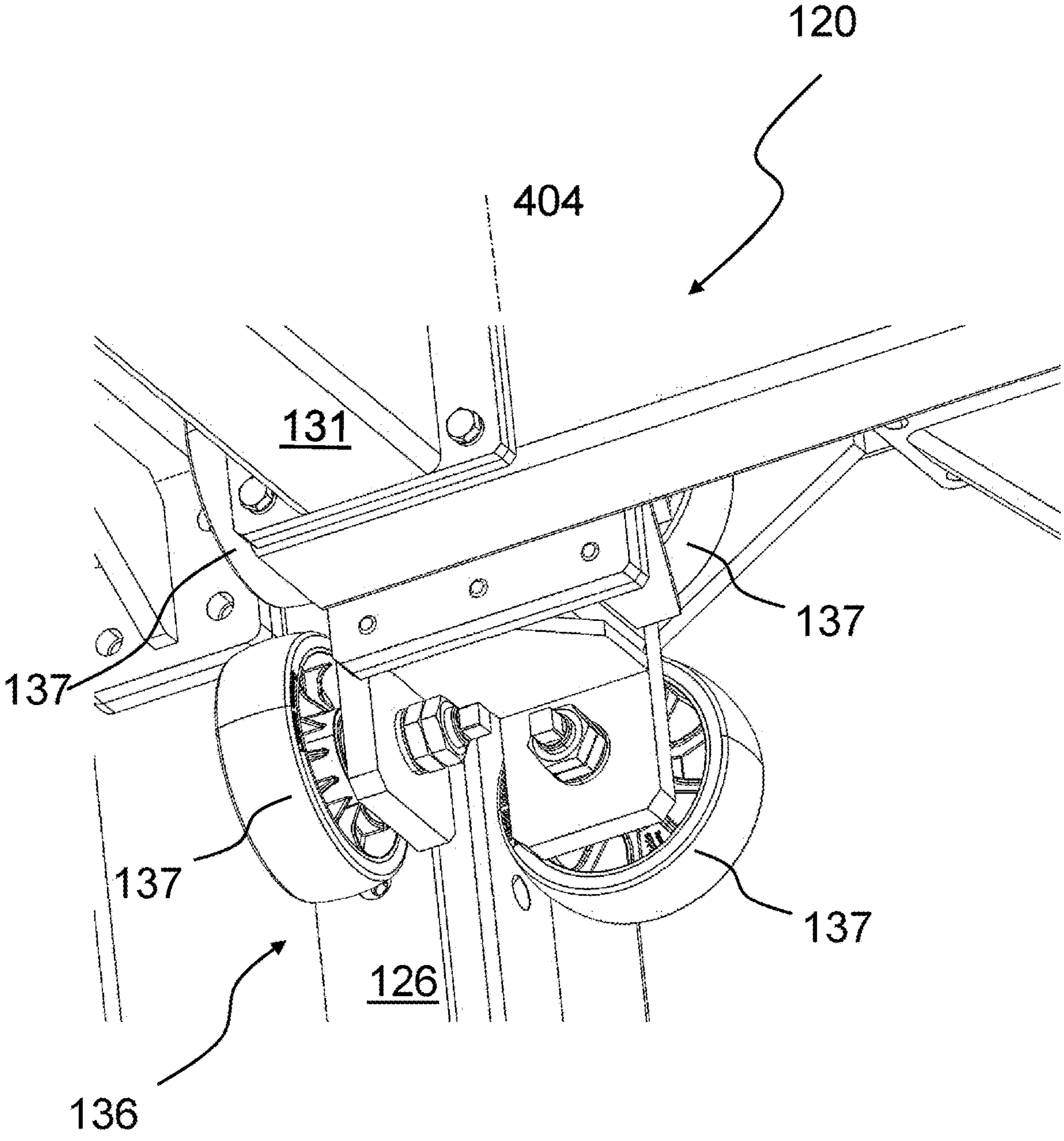
FIG. 13 shows in a perspective view a detail of the guide device according to FIG. 12 with in each case two guide rollers arranged one on top of the other of a receiving manipulation unit according to an exemplary embodiment of examples disclosed herein.

FIG. 12 shows in a front view a detail of a guide device 130 with in each case two guide rollers 137 arranged one on top of the other of a receiving manipulation unit 100 according to an exemplary embodiment of examples disclosed herein in the manner of FIGS. 3 and 4. FIG. 13 shows in a perspective view from below a detail of the guide device 136 according to FIG. 12 with in each case two guide rollers 137 arranged one on top of the other. Rather than guide rollers 137, sliding elements with sliding surfaces can also be provided.

The left-hand pair of guide rollers 137, in FIGS. 12, 13, which are arranged one on top of the other in the vertical direction 404, bears against a side surface of the supporting column 126, while the right-hand pair of guide rollers 137, in FIGS. 12, 13, which are arranged one on top of the other in the vertical direction 404, bears against a different side surface of the supporting column 126. In this example, the pairs of guide rollers 137 are offset to one another by 90°.

The guide rollers 137 are arranged on an internal frame 131 of the support frame 120 and protrude above and below the internal frame 131. This arrangement permits a quite particularly stable guidance and positioning of the workpiece receptacle (not shown) which is connected to the internal frame 131.

Figure 14:
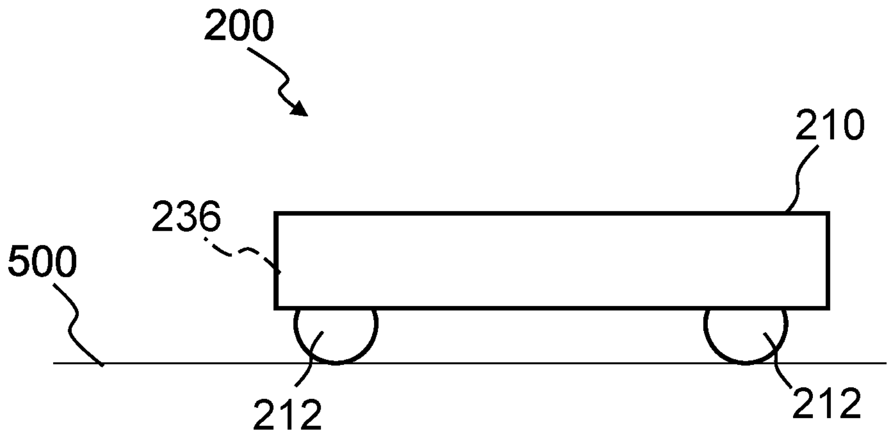
FIG. 14 shows in a side view a receivable manipulation unit according to an exemplary embodiment of examples disclosed herein.

FIG. 14 shows in a side view a receivable manipulation unit 200 according to an exemplary embodiment of examples disclosed herein. A workpiece (not shown) can be deposited on the upper face 210 of the manipulation unit 200. To this end, it is also possible to provide a suitable workpiece holder to which the workpiece is secured. A drive 236, which is not identifiable, is provided for driving at least one of the wheels 212. This drive can be, as described in FIG. 1, in each case a separate electric motor, in particular a wheel hub motor, or a central electric motor. One or more sensors are arranged on the manipulation unit 200 and configured to deliver to a control system a position, a speed, an orientation and/or a distance of the manipulation unit 200 and/or at least one other manipulation unit 100, 200, 300.

Figure 15:
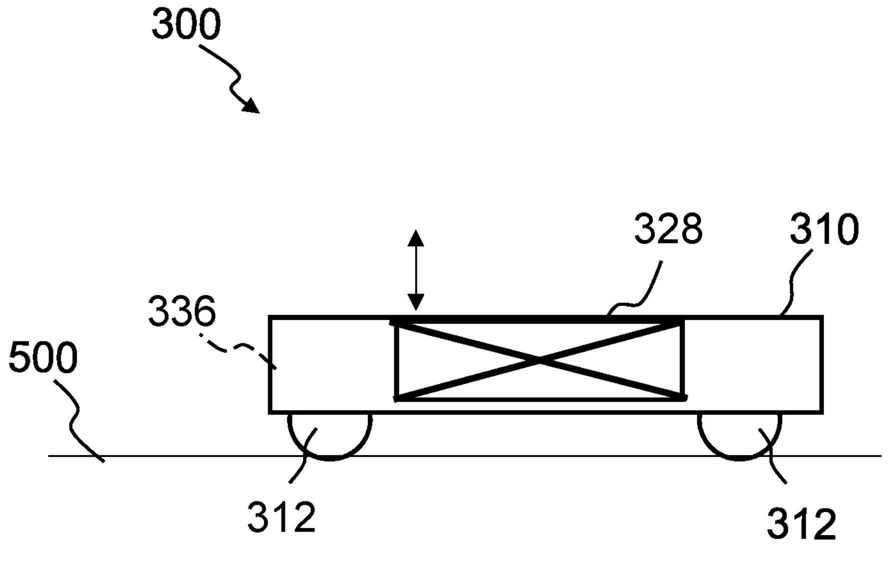
FIG. 15 shows in a front view a receivable manipulation unit with a lifting function according to an exemplary embodiment of examples disclosed herein.

FIG. 15 shows in a side view a receivable manipulation unit 300 with a lifting function according to an exemplary embodiment of examples disclosed herein. A workpiece (not shown) can be deposited on the upper face 310 of the manipulation unit 300. To this end, it is also possible to provide a suitable workpiece holder to which the workpiece is secured. The manipulation unit 300 has a lifting mechanism 328, for example a scissors lift device, by which the workpiece can be moved in the vertical direction, if required. A drive 336, which is not identifiable, is provided for driving at least one of the wheels 312. As described in FIG. 1, this drive can be in each case a separate electric motor, in particular wheel hub motor, or a central electric motor. A separate drive or a drive 336 which is common to the wheels 312 can be provided for the vertical movement of the lifting mechanism 328.

One or more sensors, not shown, are arranged and configured on the manipulation unit 300 to deliver to the control system a position, a speed, an orientation and/or a distance of the manipulation unit 300 and/or at least one other manipulation unit 100, 200, 300.

The manipulation unit 100, 200, 300 (FIGS. 1 to 9) is assigned in each case a control system which is configured such that it coordinates a movement of the manipulation unit 100, 200, 300 with movements of other manipulation units 100, 200, 300 on the floor 500. The movement of the manipulation units 100, 200, 300 can be sequential, for example a plurality of receiving manipulation units 100 and/or two or more manipulation units 100, 200, 300 at a distance behind the others, which follow a straight and/or curved and/or serpentine path on the floor 500, wherein the control system moves the manipulation units 100, 200, 300 continuously or discretely. Optionally the manipulation units 100, 200, 300 in principle can also move freely, i.e. without following a path.

The receivable manipulation units 200, 300 serve, in particular, for the transport of workpieces and/or components and not for moving the receiving manipulation unit 100.

FIGS. 16 to 20 show manipulation units 100, 200, 300 in different states in a production process of workpieces 700, in particular in a production process of bodies of vehicles, alone or in cooperation with one another.

Figure 16:
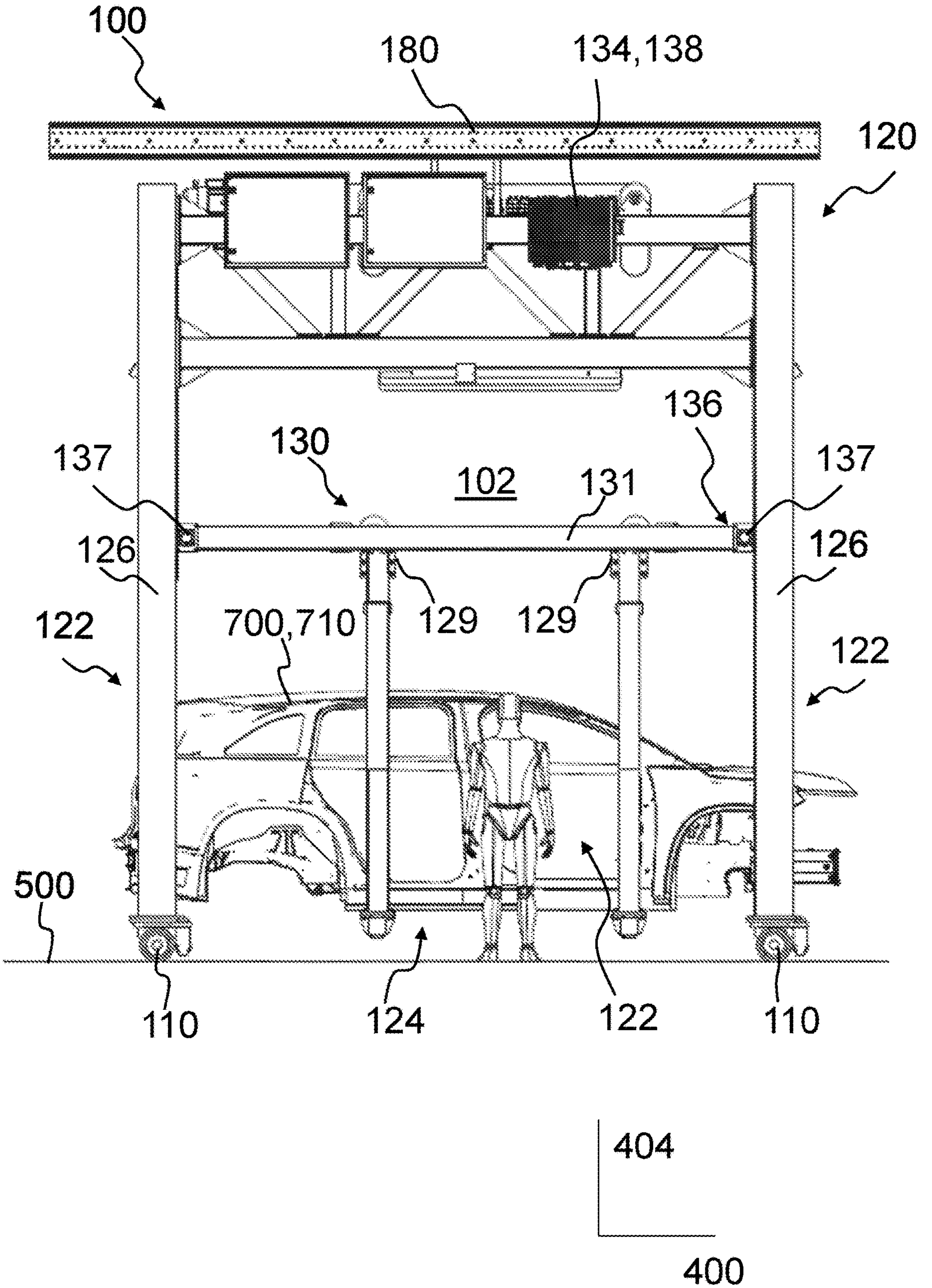
FIG. 16 shows in a side view a receiving manipulation unit according to FIG. 1 with a workpiece in the form of a body in a production step.

FIG. 16 shows in a side view a receiving manipulation unit 100 according to FIG. 1 with a workpiece 700 in the form of a vehicle body 710 in a production step in which the workpiece 700 is received in the workpiece receptacle 130. The workpiece receptacle 130 is lowered and holds the workpiece 700 in a position in the vicinity of the floor in the interior 102 of the support frame 120. The workpiece 700 can be processed easily from the floor. In the figure it can be identified that the workpiece receptacle 130 can be connected by a releasable connection 129, for example a flange connection, to the internal frame 131.

Figure 17:
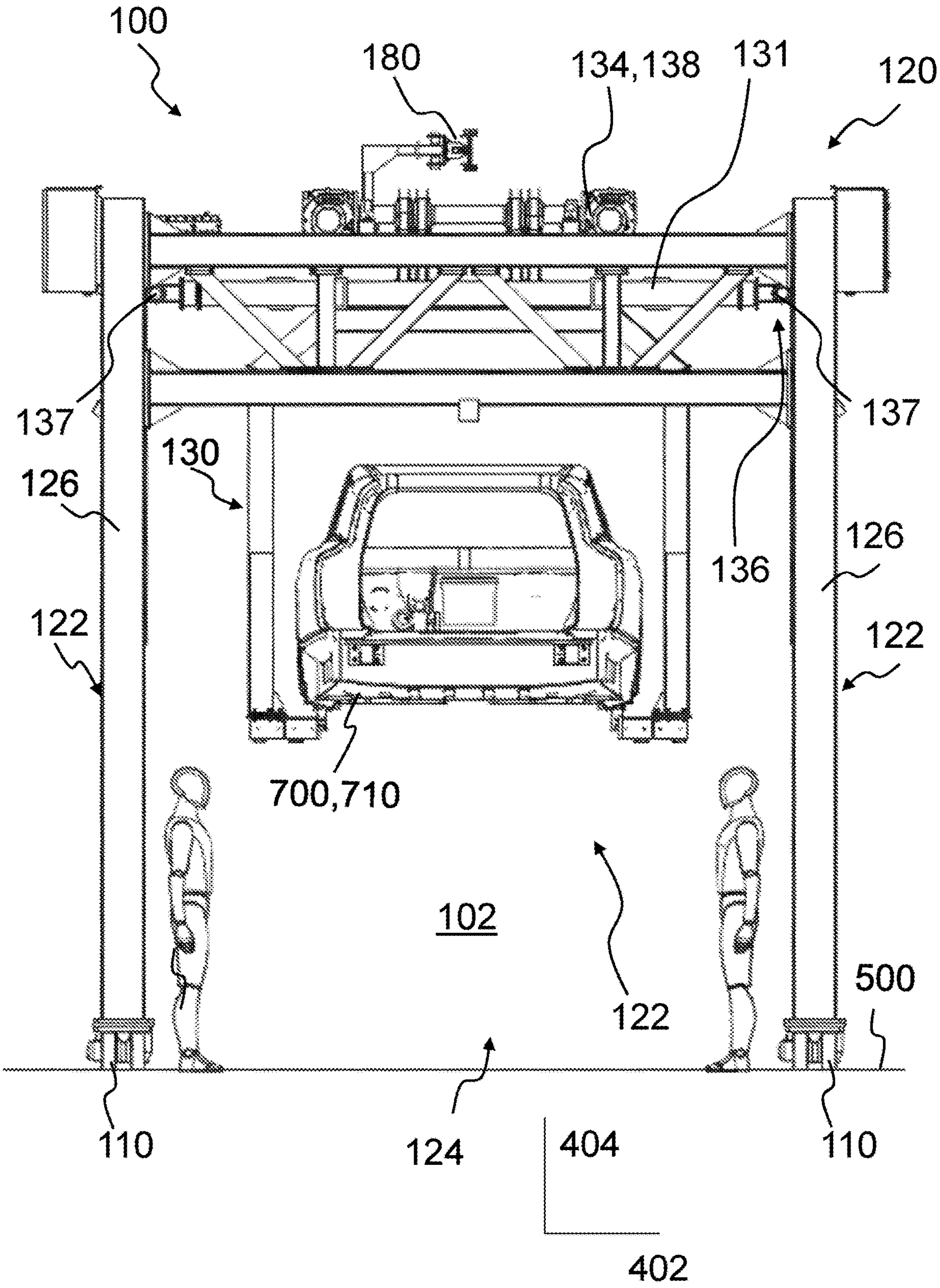
FIG. 17 shows in a front view a receiving manipulation unit according to FIG. 1 with a workpiece in the form of a body in the raised position in a further production step.

FIG. 17 shows in a front view the receiving manipulation unit 100 with the workpiece 700 in the lifted position in a further production step in which the workpiece receptacle 130 is lifted and holds the workpiece 700 in a position remote from the floor in the interior 102 of the support frame 120. The underside of the workpiece 700 can be processed easily from the floor 500. Optionally a work platform (not shown) can be arranged on the support frame 120 so that the workpiece 700 can be processed from the floor 500 and from the work platform.

Figure 18:
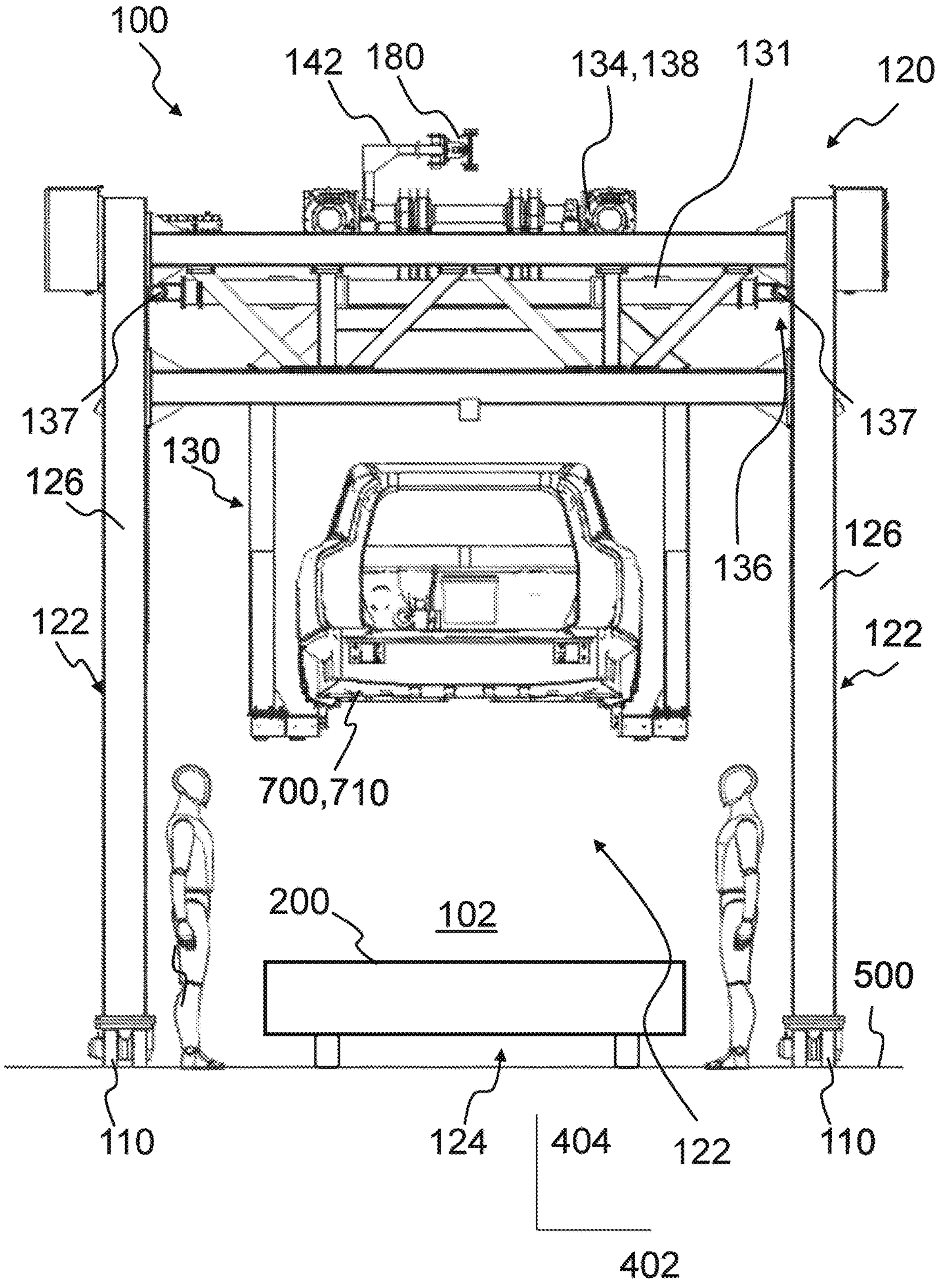
FIG. 18 shows in a front view a receiving manipulation unit according to FIG. 1 with a workpiece in the form of a body in the raised position in a further production step with the receivable manipulation unit at least partially received by the receiving manipulation unit.

FIG. 18 shows in a front view the receiving manipulation unit 100 with the workpiece 700, 710 in the lifted position in the support frame 120 in a further production step with a receivable manipulation unit 200 which is received at least partially by the receiving manipulation unit 100.

For example the workpiece 700 can be moved with the receivable manipulation unit 200 out of the internal volume 102 of the receiving manipulation unit 100. The receivable manipulation unit 200 can be moved in through a side opening 122 in the support frame 120, or the receiving manipulation unit 100 is placed above the receivable manipulation unit 200 or both manipulation units 100, 200 are moved into one another.

The workpiece 700 is transferred to the receivable manipulation unit 200 by the workpiece receptacle 130 being lowered and the workpiece 700 being deposited on the manipulation unit 200. Then the manipulation units 100, 200 are moved apart by one or both thereof being correspondingly moved. The receivable manipulation unit 200 can be removed through the same side opening 122 or through the opposing side opening 122 or through a side opening 122 transversely thereto. Rather than the receivable manipulation unit 200, it is also possible to use a receivable manipulation unit 300 (FIG. 15) which is provided with a vertical adjustment mechanism 328. In this case, the transfer can take place by a movement of one of the two manipulation units 100, 300 or even both manipulation units 100, 300.

Figure 19:
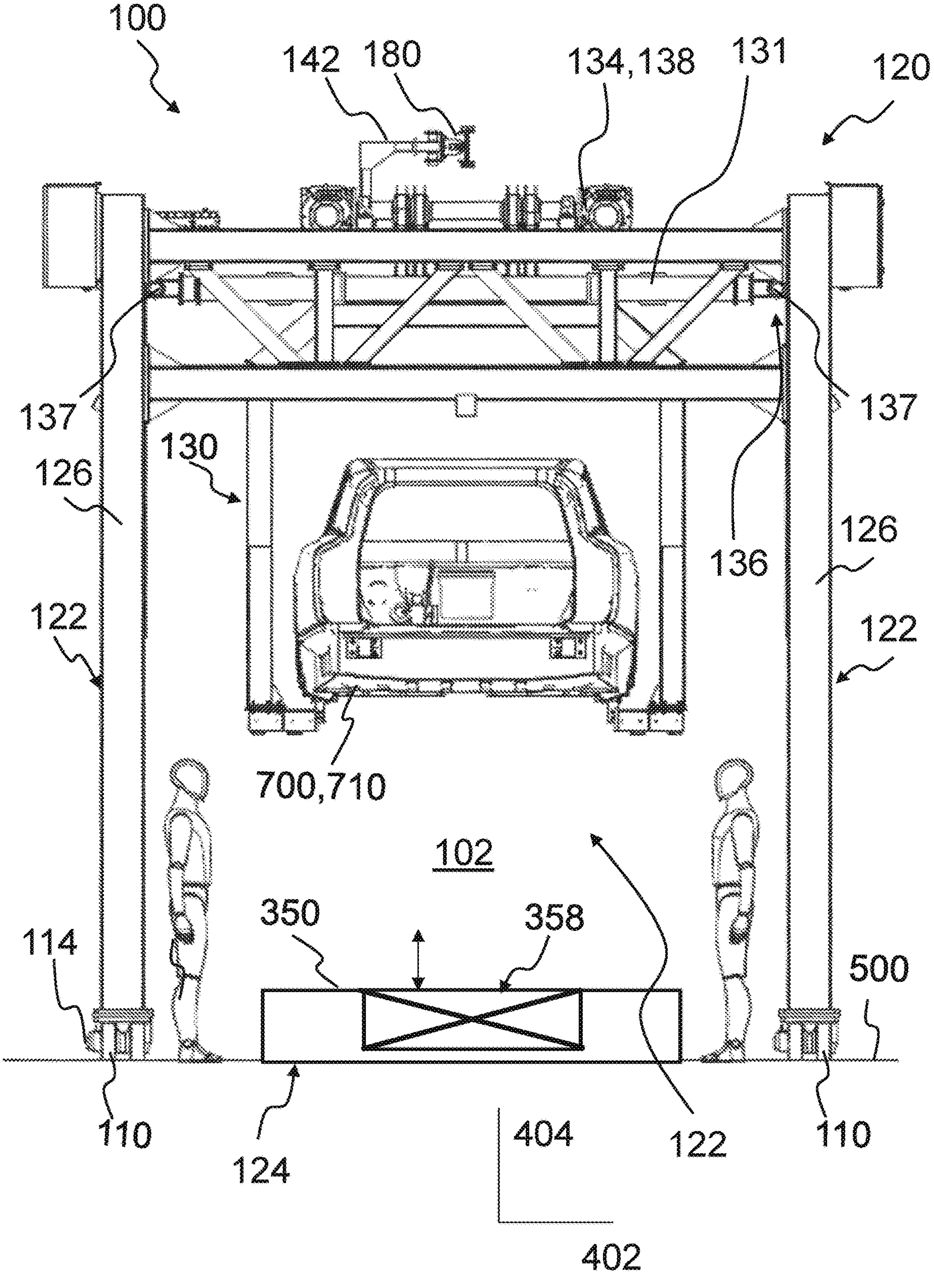
FIG. 19 shows in a front view a receiving manipulation unit according to FIG. 1 with a workpiece in the form of a body in the raised position in a further production step with a stationary receivable manipulation unit.

FIG. 19 shows in a front view a receiving manipulation unit 100 according to FIG. 1 with the workpiece 700 in the form of a body 710 in the lifted position in the support frame 120 in a further production step with the receivable manipulation unit 350.

For example, the workpiece 700 or other workpieces, with the stationary receivable manipulation unit 350 in the form of a lifting platform, can be moved into the internal volume 102 of the receiving manipulation unit 100 or moved out of the internal volume 102. The receivable manipulation unit 350 in the form of a lifting platform has a lifting mechanism 358. As an alternative to the receivable manipulation unit 350 in the form of a lifting platform, or optionally, a conveyor belt and/or a roller conveying unit can be present.

The receiving manipulation unit 100 can be placed above the manipulation unit 350 and the workpiece located thereon moved below the receiving manipulation unit 100 and lifted in the vertical direction 404 toward the workpiece 700 in the receiving manipulation unit 100.

Alternatively, the workpiece 700 in the manipulation unit 100 can be lowered onto the lifting mechanism 358 of the receivable manipulation unit 350 in the form of a lifting platform, by the workpiece receptacle 130 being lowered. Then the manipulation unit 100 and the receivable manipulation unit 350, in the form of a lifting platform, are moved apart by one or both thereof being correspondingly moved.

Figure 20:
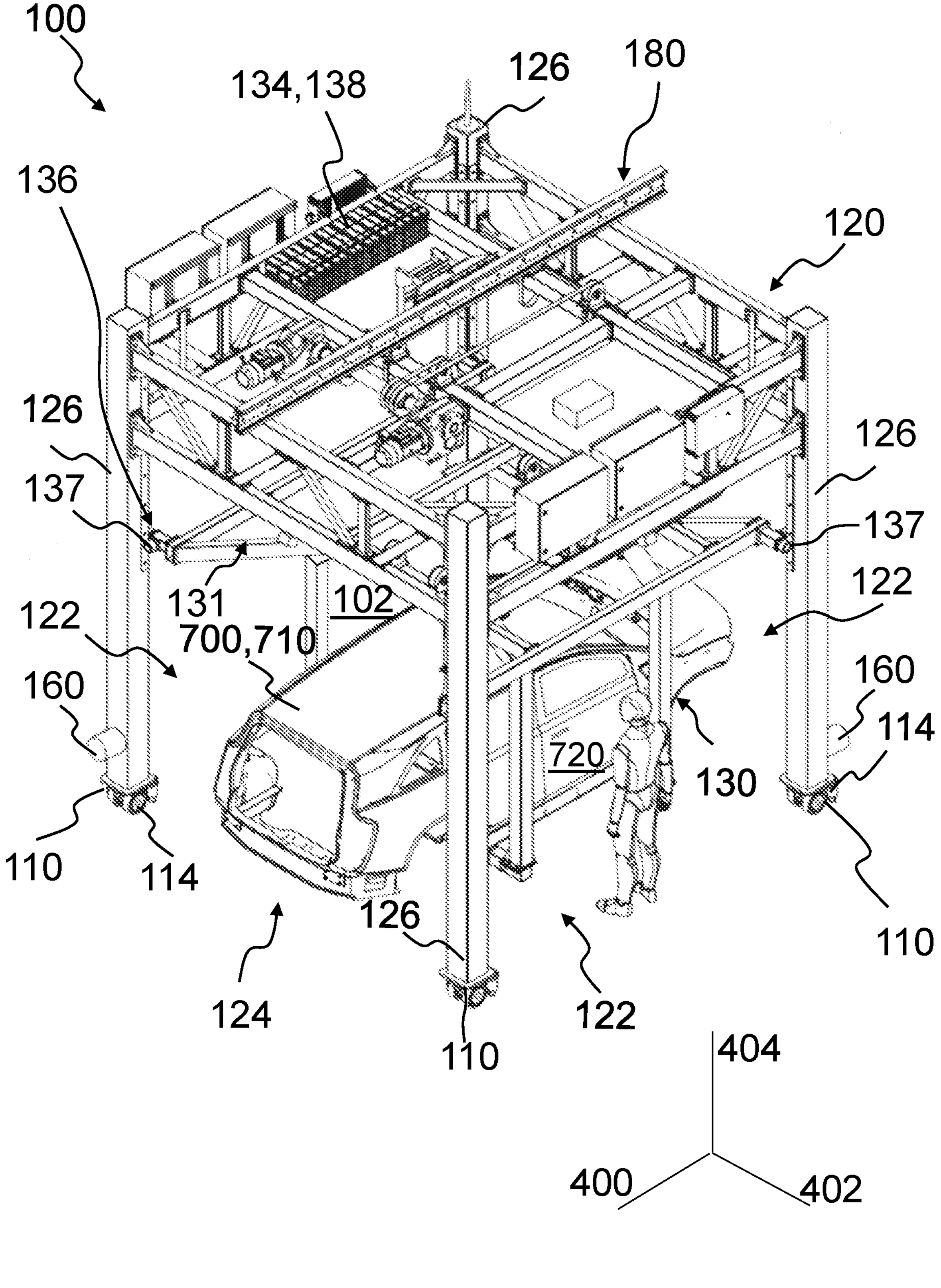
FIG. 20 shows in a perspective view a receiving manipulation unit according to FIG. 1 with a workpiece in the form of a body in a production step.

FIG. 20 shows in a perspective plan view a receiving manipulation unit 100 according to FIG. 1 with a workpiece 700 in the form of a body 710 in the lowered position in the support frame 120 in a production step. The receiving manipulation unit 100 has on its upper face an adjustment mechanism 134 for the vertical movement of the workpiece receptacle 130 transversely to a longitudinal direction 400, with a drive 138 which, for example, can lift and lower the workpiece receptacle 130 with chains and/or toothed belts and/or belts. Optionally a common drive can be provided.

Sensors 160 are arranged on the support frame 120 and configured such that they deliver to a control system a position, a speed, an orientation and/or a distance of the manipulation unit 100 and/or at least one other manipulation unit 100, 200, 300. The sensors 160 can comprise, for example, LIDAR, radar and the like.

An antenna, not denoted in more detail, which for example can receive control signals and can transmit current data to a control system is arranged on the rear supporting column 126, in the figure, of the support frame 120. It can also be provided that the different manipulation units 100, 200, 300 communicate with one another.

A position of a door 720 is indicated on the body 710, said door being able to be dismantled in an earlier production step and mounted again on the body 710 in a later production step. This can take place manually or by machine, in particular by means of robots, which dismantle the door 720 and transfer the dismantled part of the workpiece 700, for example to a receivable manipulation unit.

The door 720 can be expediently processed between the two production steps separately from the body 710 since the processing is less complex than the processing of the body 710. The doors 720 can be provided, for example, with windows, panels, handles, seals, electrical equipment and the like, before the doors 720 are combined again with the body 710 in a later production step.

Figure 21:
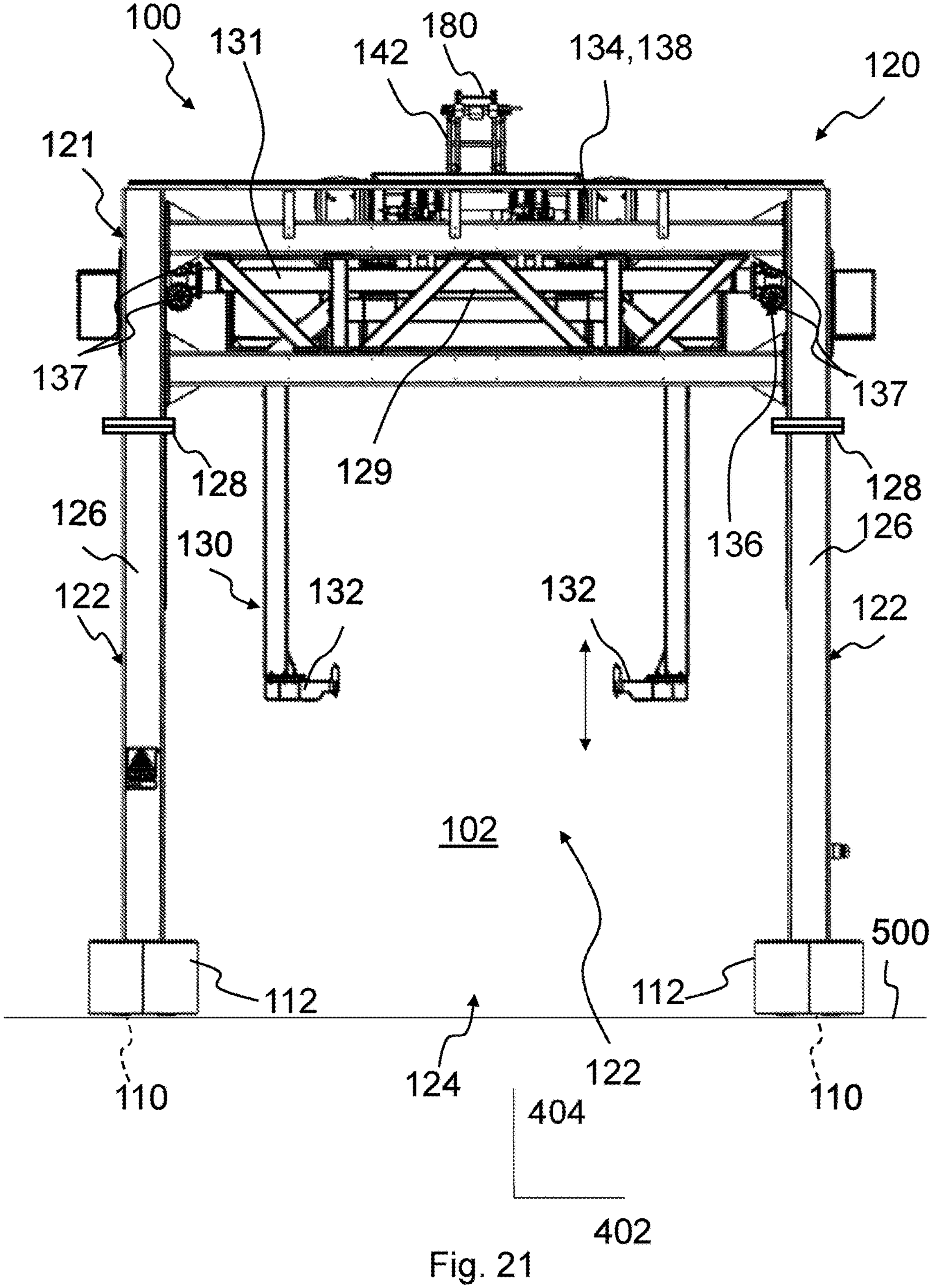
FIG. 21 shows in a front view a receiving manipulation unit according to an exemplary embodiment of examples disclosed herein with the detachable upper part of the support frame.

FIG. 21 shows in a front view a receiving manipulation unit 100 according to a further exemplary embodiment of examples disclosed herein, with a detachable upper part 121 of the support frame 120. A releasable connection 128 is arranged between the upper part 121 and the supporting columns 126, for example a flange connection. This permits a simplification of the transport of the manipulation unit 100 from a manufacturer to a place of use. Advantageously, the workpiece receptacle 130 can be designed to be releasable from the upper part 121 of the support frame 120. To this end, the workpiece receptacle 130 can be connected by a releasable connection 129 to the internal frame 131. This can be designed, for example, as a flange connection.

Moreover, it is possible to provide an upper part 121 with drives and the like as a standard construction, while the supporting columns 126 can be designed as required and, for example, can have a length adapted to a workpiece to be processed.

Figure 22:
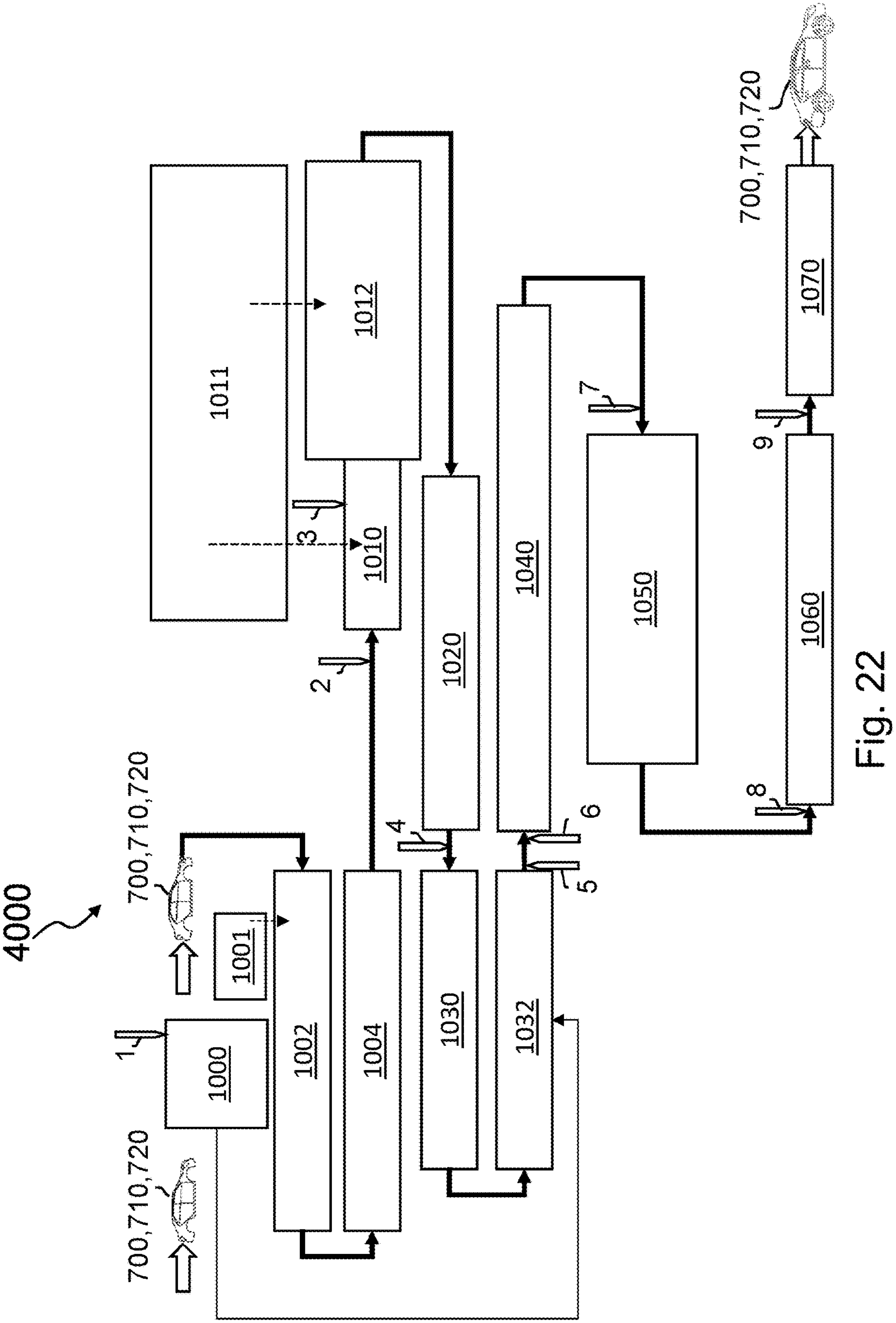
FIG. 22 shows a block diagram of process stations in a vehicle production.

FIG. 22 shows a block diagram of the process stations 1000, 1002, 1004, 1010, 1012, 1020, 1030, 1032, 1040, 1050, 1060, 1070 and component stores 1001, 1011 in an installation 4000 of a vehicle production.

Figure 23:
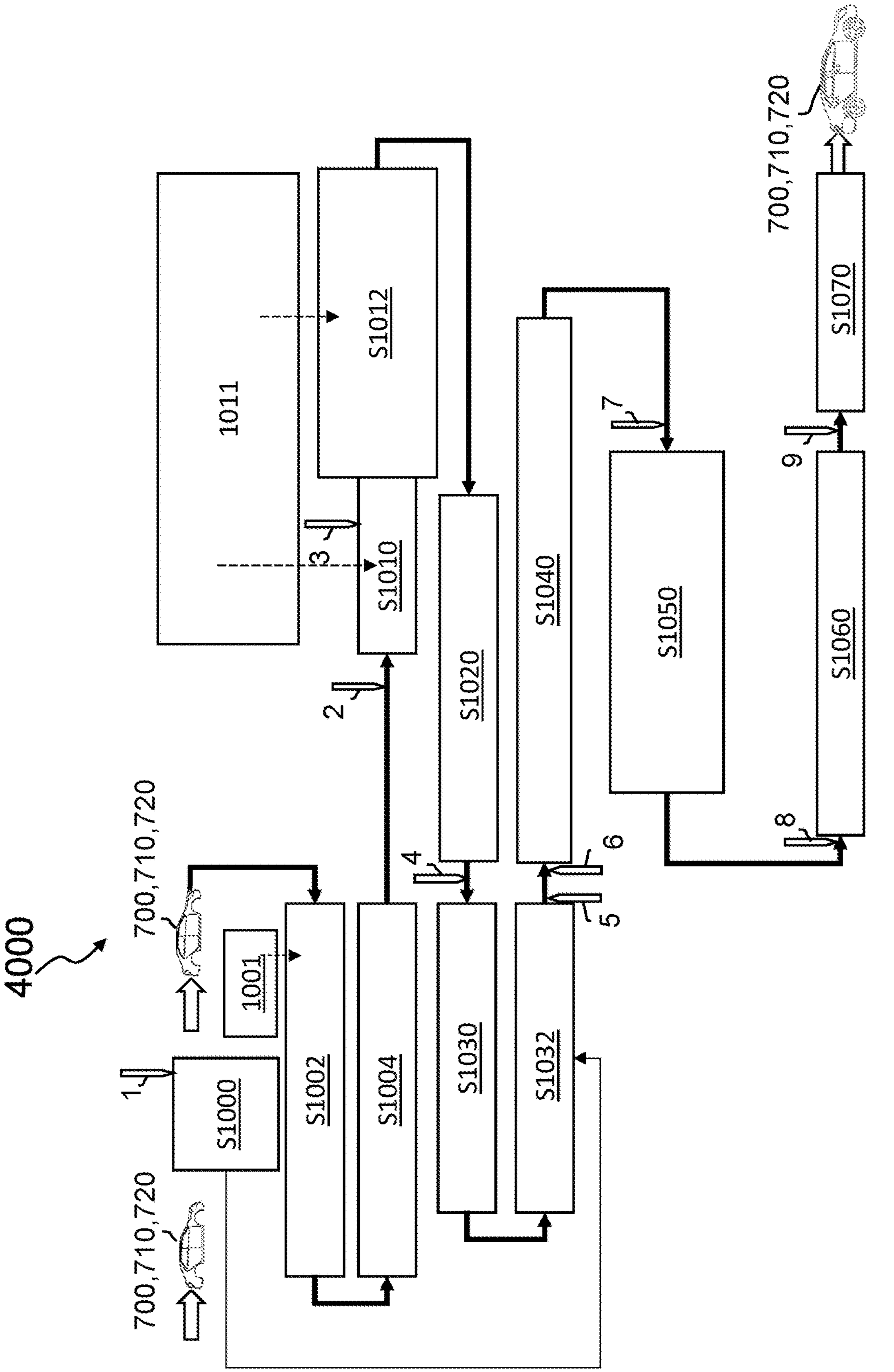
FIG. 23 shows a flow diagram of processes in a vehicle production according to FIG. 22.

FIG. 23 shows a flow diagram of the process steps S1000, S1002, S1004, S1010, S1012, S1020, S1030, S1032, S1040, S1050, S1060, S1070 taking place therein, in a vehicle production according to FIG. 22.

The installation 4000 comprises a plurality of transfer regions 1, 2, 3, 4, 5, 6, 7, 8, 9 at which a transfer of a workpiece 700 or one or more parts of a workpiece 700 takes place from receivable manipulation units 200, 300 to receiving manipulation units 100 or vice versa.

The parts of a workpiece can be parts of the body 710, for example doors and the like, or even one or more add-on parts, for example underbody, axles and the like.

The transfer regions 1, 2, 3, 4, 5, 6, 7, 8, 9 can be fixed positions in the installation, or even free routes between the process stations 1000, 1002, 1004, 1010, 1012, 1020, 1030, 1032, 1040, 1050, 1060, 1070 and component stores 1001, 1011.

For example, workpieces 700 are delivered from a temporary store of painted bodies 710 from a transport path to the process station 1000. The transfer station 1 serves for the transfer of parts, in particular of doors 720, of the workpiece 700, in particular the body 710, to the process station 1000, from the transport path to a receivable manipulation unit 200.

The transport path reaches the process station 1000 on a raised level relative to the floor 500. Doors 720 are removed from the body 710 and transferred to a level, in particular the floor 500 below the raised level, and transferred to a receivable manipulation unit 200 for the doors 720. The body 710 initially travels on the raised level and then travels onto the lower level, in particular the floor 500, and is transferred there to a receivable manipulation unit 200.

The doors 720 in step S1000 are expediently dismantled by robots and each workpiece 700 is transferred within the range of the robot to a separate manipulation unit 200 with a holder for the parts of the workpiece 700. The body 710 itself is transferred as a workpiece 700 to a further receivable manipulation unit 200 on the lower level.

For changing levels, the robots can be arranged on a hoist or on vertical rails.

The workpiece 700 is delivered in the manipulation unit 200 to the process station 1002. There in step S1002, for example, the spring supports for the tail gate and engine hood and vehicle identification numbers are attached, and the cable harness, insulation, plugs, air duct, carpet, airbags, roof panel, sun visor, seat belts, handles, interior lighting and/or dashboard are assembled. The corresponding components are provided from the component store 1001.

In the following process station 1004, in step S1004 for example, the windows (front, rear, roof) are glued in, the windshield wiper motors and covers are assembled, the engine compartment is prepared with insulation, the trunk is prepared and the door seals, roof lining, spoilers, tailgate and/or tail lights are attached.

The workpiece 700 is moved by the receivable manipulation unit 200 to the process station 1010. A transfer of the body 710 from the receivable manipulation unit 200 to a receiving manipulation unit 100 takes place at the transfer region 2 upstream of the process station 1010. At least one further receivable manipulation unit 200 or 300, in particular with a lifting function and/or longitudinal conveyance, can be interposed.

In step 1010 the heat insulation, brakes, fuel lines, tank (fuel tank, urea tank), electric drive cabling, filler neck, cable pull or cable for hand brake, brake line and/or exhaust lines are attached and assembled. Components are provided from the component store 1011.

At the transfer region 3 a delivery of a workpiece carrier takes place to a floor conveying line, for example a chain conveyor, which is encompassed by the receiving manipulation unit 100 with the body 710. In the process station 1012, in step S1012, the underbody, drive train, axles, engine cover tunnel, transmission cover tunnel are combined with the body. The process station 1012 is also known as a marriage process or marriage. The components are provided from the component store 1011.

Alternatively to a floor conveying line, the workpiece carrier can also be conveyed by a manipulation unit which is designed, for example, as a driverless transport vehicle, through the stations of the marriage process station 1012.

In the process station 1012 the receiving manipulation unit 100 is positioned as accurately as possible above the workpiece carrier. Then the body 710 is joined to the underbody and the further add-on parts, such as axles, drive, etc. via a scissors lift table. After the joining, the transport to a first screwing station takes place. The manipulation unit 100 and the conveying technology are moved with the workpiece carrier exactly synchronously. Slight deviations can be compensated by corresponding floating and compensating mechanisms.

A conveyor belt is also integrated in the screwing station and in all of the following stations, in order to move the workpiece carrier from station to station. The receiving manipulation unit 100 with the body 710 moves separately and always in a synchronized manner from station to station.

Now the automatic or manual screwing of the aforementioned add-on parts to the body 710 takes place in the further screwing stations of the process station 1012.

The screwing can take place via screwing tools attached to linear units, robots or other handling devices. The screwing tools are positioned automatically or manually in all three spatial directions. A plurality of screws are screwed at different positions by a screwing tool. The screws can be carried in a magazine on the tool head.

The provision of the magazine with screws can also take place automatically or manually. The screws contained in telescopable lateral bowl feeders are transferred to the magazine thereby. The bowl feeders can be filled by means of robots and a camera system or manually.

All of the stations of the process station 1012 can be secured by a protective fence and light grid against the entry of personnel. The receiving manipulation unit 100 of the body 710 and the conveying technology with the workpiece carrier can safely travel through these regions. All of the stationary systems can be removed from the movement region for the entry or exit of the receiving manipulation unit 100. Only when the receiving manipulation unit 100 is at a standstill can the movement region thereof be crossed.

Depending on the position and accessibility of the screw points in the engine compartment of the workpiece 700, the screwing takes place from above semi-automatically or fully automatically, namely by manually feeding tools and automatic screwing.

A work platform can be provided for operating personnel in the process station 1010. The inner region of the work platform can be separated from the outer region by an access staircase and reached via a movable bridge.

A reworking station follows the automatic and manual screwing stations. It is possible to carry out here screw connections which have not been completed or incomplete screw connections can be repeated.

If the add-on parts are completely screwed to the body 710, the workpiece carrier can be lowered into a decoupling station of the process station 1012.

The complete vehicle is now conveyed from the receiving manipulation unit 100 into the next process station 1020. The empty workpiece carrier is transported and taken over by the conveying technology to a receivable manipulation unit 200 or 300.

In the process station 1020, in step S1020, the fan and ABS wiring are assembled and wired, the exhaust, silencer, heat shields, underbody paneling, brake line-wheelhouse connection, sill cover, wheelhouse cover, hydraulic and electrical connections in the engine compartment are assembled and/or various containers are filled with appropriate liquids and/or a fuel filling takes place.

The filled and equipped workpiece 700 is transferred at the transfer region 4 from the receiving manipulation unit 100 to a receivable manipulation unit 200. In the process station 1030, in step S1030, the steering rod is connected to the steering gear, the hand brake lever is adjusted, the cladding is attached to the inner tunnel and dashboard, the bumpers, front lights, various electrical connections, wheel assembly and spare wheel cover are assembled, and the brake pedal test and the assembly of the seats take place.

In the further process stations 1032, in step S1032, the doors 720 are assembled to the body 710 in the receiving manipulation unit 100. The doors are delivered by a receivable manipulation unit 200 or 300 which functions as door storage device.

At the transfer region 5 the workpiece 700 is transferred from the receivable manipulation unit 200 to a floor platform in order to adjust the doors 720, for example, to the correct gap size and closing function. At the following transfer region 6, the workpiece 700 is transferred from the floor platform to a receivable manipulation unit 200 or 300, by which the body 700 is moved into the process station 1040 where in step S1040 various functional tests are carried out on windshield wipers, windshield washer system, battery, engine compartment, air filter and the electrical checks on the fully assembled vehicle.

In the transfer region 7 the workpiece 700 is transferred from the receivable manipulation unit 200 or 300 to a floor platform by which the fully assembled vehicle, as the workpiece 700, is transported to the process station 1050. In the process station 1050 so-called end of line tests are carried out, for which the workpiece is received by a receiving manipulation unit 100. In the process station 1050 a plurality of parallel process lines are available so that a plurality of workpieces 700 can be tested in parallel therein. For example, in step S1050 the chassis geometry, the headlamps, the driver assistance systems and the brake system are tested and, if required, adjusted or calibrated. This can take place manually, semi-automatically or fully automatically.

At the following transfer region 8 the workpiece 700 is transferred from the receiving manipulation unit 100 to a floor platform, wherein in the process station 1060, in step S1060, leak tests are carried out.

In the transfer region 9 the finished workpiece 700 is transferred from the floor platform to a floor transport belt. The vehicles are transported therefrom to the process station 1070. In step S1070, for example, stickers, the manual and documentation for the vehicle are deposited therein.

Depending on a desired number of workpieces 700 to be finished, in particular vehicles, per time unit, the number of manipulation units 100, 200, 300 used in the production process can be adapted in a simple manner without structural measures having to be undertaken to a production hall. The equipping of the vehicles along the various process stations 1000, 1002, 1004, 1010, 1012, 1020, 1030, 1032, 1040, 1050, 1060, 1070 and component stores 1001, 1011 can also be adapted in a simple manner in the installation 4000. If changes to the transport paths are required, only the path to be traveled by the manipulation units 100, 200, 300 has to be adapted.

REFERENCE SIGNS

1 Transfer region
2 Transfer region
3 Transfer region
4 Transfer region
5 Transfer region
6 Transfer region
7 Transfer region
8 Transfer region
9 Transfer region
100 Receiving manipulation unit
102 Internal volume
110 Wheel
112 Contact protection
113 Sensor
114 Drive wheel
115 Drive rotation
116 Gear wheel
120 Support frame
121 Upper part
122 Side opening
124 Bottom opening
126 Supporting column
128 Connection
129 Connection
130 Workpiece receptacle
131 Frame
132 Hook
134 Adjustment mechanism
136 Guide device
137 Guide roller
138 Drive
139 Shaft
140 Flexible element
141 Deflection roller
142 Pick-up
143 Rollers
144 Scissors
146 Holder
148 Coil
150 Cable duct
160 Sensor
180 Media rail
200 Receivable manipulation unit
210 Upper face
212 Wheel
236 Drive
300 Receivable manipulation unit
310 Upper face
312 Wheel
328 Lifting mechanism
336 Drive
350 Lifting platform
358 Lifting mechanism
400 Longitudinal direction
402 Transverse direction
404 Vertical direction
500 Floor
700 Workpiece
710 Body
720 Vehicle door
1000 Process station
1001 Component store
1002 Process station
1004 Process station
1010 Process station
1011 Component store
1012 Process station
1020 Process station
1030 Process station
1032 Process station
1040 Process station
1050 Process station
1060 Process station
1070 Process station
4000 Installation
S1000 Step
S1002 Step
S1004 Step

S1010 Step
S1012 Step
S1020 Step
S1030 Step
S1032 Step
S1040 Step
S1050 Step
S1060 Step
S1070 Step

The invention claimed is:

1. A manipulation unit for horizontally and/or vertically moving a workpiece, the manipulation unit being movable over a floor, the manipulation unit comprising:

wheels, a support frame having vertical supporting columns, and a workpiece receptacle fastened to the support frame, wherein the support frame is open on at least two sides and has a side opening for entry and/or exit of a separate manipulation unit and a bottom opening in the direction of the floor, wherein the workpiece receptacle is configured in the form of a hanger which hangs from an upper face of the support frame into an internal volume of the manipulation unit, and wherein the workpiece receptacle is guided on an exterior surface of at least one of the vertical supporting columns by a guide device for lowering and lifting the workpiece receptacle, the guide device being movable by rolling or sliding along the exterior surface of the at least one of the vertical supporting columns, for lifting or lowering the workpiece receptacle.

2. The manipulation unit as claimed in claim 1, wherein the workpiece receptacle is configured to move the workpiece arranged therein by at least one degree of freedom, wherein an adjustment mechanism, which has a common shaft for at least two flexible elements, is present for moving the workpiece receptacle, and wherein the flexible elements are connected via deflection rollers to the workpiece receptacle.

3. The manipulation unit as claimed in claim 1, wherein the guide device has at least two guide rollers or sliding surfaces which are assigned to a vertical supporting column of the at least one supporting column of the support and which bear against two different surfaces of the supporting column frame when lifting and lowering the workpiece receptacle.

4. The manipulation unit as claimed in claim 1, further including at least one sensor which is arranged on the support frame, the at least one sensor configured to provide output to a control system, the output including a position, a speed, an orientation and/or a distance of at least one other manipulation unit, wherein the at least one sensor is configured to monitor an environment when the manipulation unit turns, pulls away from a rectilinear movement or is cornering.

5. The manipulation unit as claimed in claim 4, wherein the at least one sensor is configured to monitor an environment when the manipulation unit turns, pulls away from a rectilinear movement or is cornering.

6. The manipulation unit as claimed in claim 1, wherein the manipulation unit is configured as a receiving manipulation unit which receives a receivable manipulation unit at least partially in an internal volume of the receiving manipulation unit.

7. The manipulation unit as claimed in claim 6, wherein the receiving manipulation unit has an opening for the entry and/or exit of the receivable manipulation unit.

8. The manipulation unit as claimed in claim 6, wherein the receiving and the receivable manipulation units are arranged at least in some regions on a common travel plane.

9. The manipulation unit as claimed in claim 6, wherein the receiving manipulation unit has at least one opening toward the floor and/or is open toward the floor, so that the workpiece located in the manipulation unit is accessible from the floor.

10. The manipulation unit as claimed in claim 6, wherein the receiving manipulation unit has at least four supporting columns which can roll with one or more wheels on the floor and between which a workpiece receptacle is arranged, wherein at least some of the wheels includes a contact protection.

11. The manipulation unit as claimed in claim 6, wherein the receiving manipulation unit includes an adjustment mechanism for moving a workpiece relative to a receivable manipulation unit.

12. The manipulation unit as claimed in claim 1, wherein the workpiece receptacle is guided by rollers on the exterior surface or the exterior surface includes a sliding surface to guide the workpiece receptacle.

13. The manipulation unit as claimed in claim 12, wherein the workpiece receptacle is guided by rollers on the exterior surface.

14. The manipulation unit as claimed in claim 12, wherein the exterior surface is a first exterior surface, wherein the workpiece receptacle is further guided by a second exterior surface of the at least one supporting column that is perpendicular to the first exterior surface, and wherein the first and second exterior surfaces extend along a vertical direction.

15. The manipulation unit as claimed in claim 1, wherein the guide device has at least two pairs of guide rollers or sliding surfaces, the two guide rollers or sliding surfaces of each pair being arranged one on top of the other in a vertical direction and bearing against the same surface of a supporting column of the support frame, and in each case one of the pairs of guide rollers or sliding surfaces bearing against two different surfaces of a supporting column of the support frame when lifting and lowering the workpiece receptacle.

16. An installation having a group of manipulation units comprising at least one transfer region on which a transfer of a workpiece or one or more parts of the workpiece takes place from a first manipulation unit to a second manipulation unit, wherein the first manipulation unit is designed as a receivable manipulation unit, wherein the second manipulation unit is designed as a receiving manipulation unit with an internal volume, as claimed in claim 1, wherein the receivable manipulation unit together with the workpiece or a part of a workpiece can be at least partially received in the internal volume of the receiving manipulation unit.

17. The installation as claimed in claim 16, wherein at least one of the manipulation units is a receivable manipulation unit, which is configured as a driverless transport vehicle, a stationary lifting platform, a conveyor belt, and/or a roller conveying unit.

18. The installation as claimed in claim 16, wherein an assembly of workpieces which are arranged on at least two manipulation units takes place on at least one transfer region.

19. The installation as claimed in claim 16, wherein an adjustment mechanism, which has a common shaft for at least two flexible elements, is present for moving the workpiece receptacle, wherein the flexible elements are connected via deflection rollers to the workpiece receptacle.

20. The installation as claimed in claim 19, wherein the guide device includes at least two guide rollers or sliding surfaces which are assigned to a supporting column and which bear against two different surfaces of the supporting column of the support frame.

21. The installation as claimed in claim 20, wherein the guide device has at least two pairs of guide rollers or sliding surfaces, the two guide rollers or sliding surfaces of each pair being arranged one on top of the other in a vertical direction and bearing against the same surface of a supporting column of the support frame, and in each case one of the pairs of guide rollers or sliding surfaces bearing against two different surfaces of a supporting column of the support frame.

22. The installation as claimed in claim 16, wherein a receivable manipulation unit includes an adjustment mechanism for moving a workpiece relative to a receiving manipulation unit.

23. The installation as claimed in claim 16, wherein process stations are surrounded at least in some regions by walls which are at least temporarily opened for the receiving manipulation units.

24. An installation comprising a plurality of manipulation units, wherein at least one of the manipulation units is configured as claimed in claim 1, comprising a driverless transport vehicle for horizontally and/or vertically moving a workpiece which is movable over a floor, having wheels, a support frame and a workpiece receptacle fastened to the support frame, wherein the support frame is open on several sides and has at least one side opening for entry and/or exit of a separate manipulation unit and a bottom opening in the direction of the floor.

25. The installation as claimed in claim 24, wherein three types of manipulation units are present, in each case with a plurality of tasks which in total represent essential tasks of an entire production.

26. The installation according to claim 24, wherein at least one of the manipulation units is configured as a driverless transport vehicle without a lifting function, for receiving and for transporting doors and/or separate prefabricated workpieces for a body.

27. The installation according to claim 24, wherein at least one of the manipulation units is configured as a driverless transport vehicle with a lifting function, for receiving and for transporting a body and/or separate prefabricated workpieces for a body.

28. A method for operating an installation, as claimed in claim 16, wherein two manipulation units are moved relative to one another such that the one manipulation unit as the receivable manipulation unit at least partially protrudes into the other manipulation unit as the receiving manipulation unit, wherein in a further method step, a workpiece is transferred between the manipulation units.

29. The method as claimed in claim 28, wherein at least one self-propelled transport vehicle or a lifting platform and/or a conveyor belt and/or a roller conveying unit is used as manipulation units.

30. The method as claimed in claim 28, wherein a transfer of the workpiece from a receivable manipulation unit to a receiving manipulation unit takes place by at least one of the two manipulation units being moved such that the receivable manipulation unit is at least partially arranged in or below the receiving manipulation unit.

31. The method as claimed in claim 30, wherein the receivable manipulation unit travels in or below the receiving manipulation unit.

32. The method as claimed in claim 28, wherein a manipulation unit moves a workpiece, wherein the workpiece is an underbody, toward a lifting platform and/or a conveyor belt and/or a roller conveying unit and transfers the workpiece to the lifting platform and/or the conveyor belt and/or the roller conveying unit.

33. The method as claimed in claim 32, wherein a transfer of the workpiece, wherein the workpiece to be transferred is an underbody, takes place by the lifting platform and/or the conveyor belt and/or the roller conveying unit to the receiving manipulation unit and a workpiece arranged thereon.

34. The method as claimed in claim 32, wherein a transfer of a workpiece, wherein the workpiece to be transferred is a body, takes place such that the receiving manipulation unit travels over a receivable manipulation unit, in particular wherein the manipulation units are moved apart after the workpiece has been transferred.

35. The method as claimed in claim 32, wherein a receiving manipulation unit is moved above the lifting platform such that the lifting platform with the workpiece is at least partially received in an internal volume of the receiving manipulation unit.

36. The method as claimed in claim 28, wherein a receivable manipulation unit moves into a receiving manipulation unit at one point, and moves out again at a different point, on a different side and/or at a different time.

37. The method as claimed in claim 28, wherein a dismantling of doors of the workpiece, wherein the workpiece to be dismantled is a body, takes place on a dismantling device for dismantling parts of the workpiece during a production process of a vehicle, with a transfer region for a workpiece, wherein the workpiece is a body, from a transport device to a receivable manipulation unit for receiving the workpiece and a receivable manipulation unit for receiving parts of the workpiece on different levels, wherein a change of levels between the parts of the workpiece on the manipulation unit thereof and the workpiece on the manipulation unit thereof takes place during the dismantling of the parts of the workpiece and the transfer thereof to a manipulation unit and the transfer of the workpiece to a further manipulation unit.

38. The method as claimed in claim 37, wherein the manipulation unit is moved with the parts of the workpiece below the level on which the manipulation unit is located with the workpiece.

* * * * *